(12) United States Patent
Yasui et al.

(10) Patent No.: US 7,970,513 B2
(45) Date of Patent: Jun. 28, 2011

(54) STEERING CONTROL APPARATUS FOR A VEHICLE

(75) Inventors: Yoshiyuki Yasui, Nagoya (JP); Hiroyuki Kodama, Kariya (JP); Kenji Asano, Toyota (JP); Toshihisa Kato, Handa (JP)

(73) Assignee: Advics Co., Ltd., Kariya, Aichi Pref. (JP)

( * ) Notice: Subject to any disclaimer, the term of this patent is extended or adjusted under 35 U.S.C. 154(b) by 0 days.

(21) Appl. No.: 11/760,106

(22) Filed: Jun. 8, 2007

(65) Prior Publication Data

US 2007/0289808 A1 Dec. 20, 2007

(30) Foreign Application Priority Data

Jun. 15, 2006 (JP) .................................. 2006-165665
Jun. 15, 2006 (JP) .................................. 2006-165666

(51) Int. Cl.
*B62D 5/04* (2006.01)

(52) U.S. Cl. ................ 701/41; 701/42; 701/43; 180/446

(58) Field of Classification Search ..................... 701/41, 701/42; 180/446
See application file for complete search history.

(56) References Cited

U.S. PATENT DOCUMENTS

| | | | |
|---|---|---|---|
| 6,032,755 A * | 3/2000 | Blandino et al. | 180/446 |
| 6,154,696 A | 11/2000 | Nishi et al. | |
| 6,349,789 B1 * | 2/2002 | Nakano et al. | 180/446 |
| 6,360,153 B1 * | 3/2002 | Shinmura et al. | 701/48 |
| 6,597,975 B1 * | 7/2003 | Shinmura et al. | 701/48 |
| 7,374,014 B2 * | 5/2008 | Yasui et al. | 180/446 |
| 2003/0158642 A1 | 8/2003 | Mould et al. | |
| 2003/0221898 A1 * | 12/2003 | Yasui et al. | 180/446 |
| 2006/0015226 A1 | 1/2006 | Bernzen et al. | |

FOREIGN PATENT DOCUMENTS

DE 102 35 039 A1 2/2004
(Continued)

OTHER PUBLICATIONS

Koibuchi et al. Machine translation of Japanese Publication 2005-67455-A, Mar. 17, 2005.*

(Continued)

*Primary Examiner* — Jack Keith
*Assistant Examiner* — Adam Tissot
(74) *Attorney, Agent, or Firm* — Buchanan Ingersoll & Rooney PC

(57) ABSTRACT

A steering control apparatus is provided for a vehicle having a steering wheel for steering its steered wheels, a power source for generating power, and drive shafts for transferring the power to the wheels, to be served as driving wheels of the vehicle, and a traction control device for controlling braking torque applied to the wheels. The apparatus comprises a detection device for detecting the braking torque applied to the wheels, a calculation device for calculating a driving force difference between the wheels, on the basis of the detected braking torque, a power source state detection device for detecting an actuating state of the power source, and a control device provided for controlling steering torque created by the steering wheel, and applying torque steer reducing torque to the steering wheel. A desired value of the torque steer reducing torque is determined, on the basis of the driving force difference and the actuating state of the power source. And, the torque steer reducing torque is applied to the steering wheel, in accordance with the desired value of the torque steer reducing torque, to reduce the torque steer.

7 Claims, 17 Drawing Sheets

FOREIGN PATENT DOCUMENTS

| | | |
|---|---|---|
| EP | 1 331 158 A1 | 7/2003 |
| JP | 5-77653 A | 3/1993 |
| JP | 11-129927 A | 5/1999 |
| JP | 2005-67455 A | 3/2005 |
| JP | 2005067455 A * | 3/2005 |
| JP | 2005-170116 A | 6/2005 |
| WO | 2005/019010 A1 | 3/2005 |

OTHER PUBLICATIONS

German Office Action dated Apr. 15, 2010 issued in the corresponding German Patent Application No. 10 2007 000 319.8-21 and English-language translation.

English-language translation of Chinese Office Action dated Sep. 18, 2009 issued in the corresponding Chinese Patent Application No. 2007101107699.

* cited by examiner

MODIFIED VALUE (Ttsh) OF TORQUE STEER REDUCING TORQUE

MODIFIED VALUE (Ttsh) OF TORQUE STEER REDUCING TORQUE

US 7,970,513 B2

STEERING CONTROL APPARATUS FOR A VEHICLE

This application claims priorities under 35 U.S.C. Sec. 119 to No. 2006-165665 filed in Japan on Jun. 15, 2006 and No. 2006-165666 filed in Japan on Jun. 15, 2006, the entire contents of which are herein incorporated by reference.

BACKGROUND OF THE INVENTION

The present invention relates to a steering control apparatus for a vehicle, and particularly relates to a steering control apparatus for reducing torque steer created on a steering wheel of the vehicle.

In general, in a steering apparatus for a vehicle with steered wheels thereof being served as its driving wheels, such a phenomenon that steering effort or steer-holding force shall vary in response to variation of driving force, is called as torque steer, which is desired to be restrained. For example, Japanese Patent Laid-open Publication No. 11-129927, which corresponds to U.S. Pat. No. 6,154,696, discloses a vehicle equipped with an electric power steering device and a torque split arrangement for individually controlling (or, distributing) traction and/or braking force between right and left wheels), to improve its maneuverability and stability. In the U.S. Pat. No. 6,154,696, there is disclosed a steering control system for controlling torque steer in a vehicle equipped with an electric power steering device and a torque split arrangement for individually controlling traction and/or braking force of right and left wheels, which comprises a torque difference input unit for receiving a torque difference signal corresponding to a difference in traction and/or braking force between the right and left wheels, a torque steer canceling steering torque determining unit for producing a torque steer canceling steering torque signal that is required to cancel a steering torque arising from the difference in traction and/or braking force between the right and left wheels, and a drive circuit for supplying a drive current to the electric power steering device according to the torque steer canceling steering torque signal.

Furthermore, according to Japanese Patent Laid-open Publication No. 2005-170116, an apparatus is proposed to solve such a problem in the prior art as described above that the torque steer cancelling control is performed only when the difference in force was caused between the right and left wheels, i.e., difference in rotation was caused between the right and left wheels. That is, there is proposed a steering control apparatus, wherein, instead of the difference in rotation between the right and left wheels, by watching a difference in transferring torque between right and left driving axles, which might cause the torque steer, detecting or estimating engine torque to cancel the torque steer, and obtaining an estimated value of torque steer by a memory circuit which memorizes a relationship of the difference in transferring torque between the right and left driving axles against the engine torque, to cancel the torque steer created by the difference in transferring torque between the right and left driving axles. With respect to the vehicle with steered wheels thereof being served as its driving wheels, according to Japanese Patent Laid-open Publication No. 5-77653, a driving force distribution device is proposed for distributing the driving force to right and left wheels of a vehicle of four-wheel drive system, or the like.

On the other hand, in Japanese Patent Laid-open Publication No. 2005-067455, there is disclosed a method for reducing the torque steer when a traction control is being performed. Especially, referring to FIG. 3, it is described that if it is determined that the traction control is being performed, a driving force difference ($\Delta Fdr$) between right and left rear wheels served as driving wheels is estimated according to a known manner in a technical field in issue, and it is determined whether the absolute value of the driving force difference ($\Delta Fdr$) is larger than a reference value ($\Delta Fdr0$ of positive constant), i.e., it is determined whether the torque steer at the time of driving mode will be excessive, or not. If the result is negative, the torque steer reducing torque ($Tdts$) at the time of driving mode is set to be zero. Whereas, if the result is affirmative, the torque steer reducing torque ($Tdts$) will be calculated by the product of $Kdts$ and $\Delta Fdr$, where $Kdts$ is a positive constant coefficient.

However, it is still difficult to sufficiently reduce the torque steer, according to compensation based on the relationship of the difference in torque between the right and left driving axles against the engine torque, as described in Japanese Patent Laid-open Publication No. 2005-170116.

Hereinafter, the cause for creating the torque steer will be analyzed. The torque steer is meant by a phenomenon, wherein according to a front engine front drive vehicle (so called FF vehicle) or four-wheel drive vehicle with the steered wheels thereof being served as its driving wheels, the steering wheel is steered by the steered wheels, when the vehicle is accelerated, i.e., the phenomenon with the steered wheels provided for steering the steering wheel. As for the cause for creating the torque steer, mainly raised are "bent angle of a constant speed universal joint for drive shafts" and "difference in driving force between right and left wheels, when a kingpin offset is provided."

At the outset, will be explained "torque steer caused by bent angle of a constant speed universal joint for drive shafts", as (1). With respect to the relationship between the drive shafts and wheels, supposing that the bent angle $\theta$ of the constant speed universal joint for the drive shafts is provided, as shown in FIG. 19, if the driving torque transferred by the drive shafts is indicated by "$Tdrv$", secondary couple moment ($Mz$) is created for steering the wheels, according to the following equation (1);

$$Mz = Tdrv \cdot \tan(\theta/2) \qquad (1)$$

In FIG. 20, according to the vehicle with the steered wheels thereof being served as its driving wheels, a part of it including its steering apparatus is disclosed to clarify the corresponding relationship between its front view and plan view. That is, in FIG. 20, according to the vehicle with an engine EG and a transmission TR arranged in a transverse direction to the vehicle moving direction, to obtain a space efficiency in an engine compartment, length and arrangement of the drive shafts (maybe called as drive axles) DS1 and DS2 are not provided symmetrically in the transverse direction. Therefore, in the case where the joint bent angles for the drive shafts connected to the driving wheels are different between the right and left wheels WH1 and WH2, a moment ($Mz$) for steering the wheels, or called as a steered torque, will be caused to provide its difference between the right and left wheels WH1 and WH2, to create the torque steer for steering the steering wheel SW by the steered wheels when the vehicle is accelerated. Thus, the torque steer caused by the bent angle of the constant speed universal joint for the drive shafts is called as the steady-state torque steer.

Next will be explained "torque steer caused by the difference in driving force between the right and left wheels, when the kingpin offset is provided", as (2). As shown in FIG. 20, the steered wheels WH1 and WH2 are provided with kingpins KP1 and KP2 to be capable of being steered, and the position of the steered center TC, i.e., intersection of the kingpin axis and road surface, does not correspond to the position of force applied point DP of the driving force, so that there exists a distance between those two points, i.e., kingpin offset (KPo), whereas (KPc) in FIG. 20 designates a wheel center kingpin offset. In the case where there exists the kingpin offset (KPo), when the vehicle is accelerated to apply the driving force to the steered wheels WH1 and WH2, the torque for steering the steered wheel, i.e., steered torque, is created, which can be obtained by [driving force]×[kingpin offset]. If the driving force is equal to each other between the right and left wheels WH1 and WH2, the steered torque will be cancelled, so that no torque steer will be caused. If the driving force is different from each other between the right and left wheels WH1 and WH2, however, "torque steer for steering the steering wheel by means of the steered wheel (right and left wheels)" will be caused.

As for the case where the driving force is different from each other between the right and left wheels as described in (2), the following three cases may be considered:

(2-a) "Driving Force Difference Between Right and Left Wheels due to Characteristics of Drive Shafts"

In the case where there exists a difference in characteristic between the drive shafts DS1 and DS2, a transient (dynamic) difference will be caused in transferring the torque. Even in the case where the drive shafts DS1 and DS2 are made of the same material, and formed with the same cross sectional area, if their lengths are different from each other, torsional rigidity of them shall be different from each other. Therefore, when the vehicle is accelerated rapidly, the driving force applied to the wheel connected with the drive shaft, which is relatively short to provide relatively high torsional rigidity, will be increased rapidly with a slight delay. On the contrary, the driving force applied to the wheel connected with the drive shaft, which is relatively long to provide relatively low torsional rigidity, will be increased gradually. Therefore, the difference in transient driving force will be caused between the right and left wheels, thereby to create the torque steer, which is called as the transient torque steer.

(2-b) "Driving Force Difference Between Right and Left Wheels Due to a Traction Control"

If braking torque is applied to one wheel according to a traction control, the driving force applied to the other one wheel corresponding to the braking torque will be increased. Particularly, in the case where the traction control is performed on a so-called μ-split road with different coefficients of friction provided between the right and left wheels, the driving force difference between the right and left wheels will be caused largely.

(2-c) "Driving Force Difference Between Right and Left Wheels Due to a Driving Force Distribution Device"

In the case where a driving force distribution device is provided between the right and left wheels, the difference in driving force between the right and left wheels will be caused. As for the driving force distribution device, there are known the one controlled electronically, and the one for limiting their differential mechanically, e.g., viscous coupling or the like, as disclosed in the aforementioned Japanese Patent Laid-open Publication No. 5-77653, for example.

The aforementioned (1) and (2) relate to the causes of the torque steer created at the time when the vehicle is accelerated, each part for creating the torque steer will be indicated in FIG. 21, wherein the torque steer will be caused at each part of a vehicle by the aforementioned (1), (2-a), (2-b) and (2-c). Among them, with respect to (1) and (2-a), the torque steer relates to the one resulted from the layout and characteristics of the drive shafts, which will be called hereinafter as "torque steer resulted from drive shafts". Since this torque steer has been fixed as a characteristic of the vehicle, it will be created only one direction limited with respect to a steering direction of the steering wheel. On the other hand, with respect to (2-b), in order to reduce the torque steer created at the time when a traction control is performed, which will be called hereinafter as "torque steer resulted from traction control", in the case where the torque steer reducing torque (Tdts) is calculated by the product of the positive constant coefficient (Kdts) and the driving force difference (ΔFdr), if the absolute values of the driving force differences are caused, the torque steer reducing torque with the same absolute value will be determined to be applied, both in right and left steering directions. And, with respect to (2-c), the torque steer relates to the one resulted from the driving force distribution device, which will be called hereinafter as "torque steer resulted from driving force distribution".

As described in the aforementioned (1) and (2-a), the torque steer resulted from drive shafts will be created only one direction limited with respect to the steering direction of the steering wheel. However, when the traction control is performed, the vehicle is being accelerated. Therefore, if the steering direction for causing the torque steer resulted from traction control and the steering direction for causing the torque steer resulted from drive shafts are the same, the torque steer will be amplified with each other, thereby to be increased. On the contrary, if the steering direction for causing the torque steer resulted from traction control and the steering direction for causing the torque steer resulted from drive shafts are opposite to each other, the torque steer will be cancelled with each other, thereby to be decreased. As a result, if the torque steer reducing control is performed on the basis of the same characteristic both in the right and left steering directions, a different feeling might be given to the vehicle driver.

In the case where the aforementioned torque steer resulted from driving force distribution or torque steer resulted from traction control is being created, the vehicle is being accelerated, so that the torque steer resulted from drive shafts is created at the same time. Therefore, if the steering direction for causing the torque steer resulted from drive shafts is the same as the steering direction for causing the torque steer resulted from driving force distribution, or the steering direction for causing the torque steer resulted from traction control, the torque steer will be amplified with each other, thereby to be increased. On the contrary, if the steering direction for causing the torque steer resulted from drive shafts is opposite to the steering direction for causing the torque steer resulted from driving force distribution, or the steering direction for causing the torque steer resulted from traction control, the torque steer will be cancelled with each other, thereby to be decreased. Therefore, in order to perform the torque steer reducing control without giving the different feeling to the vehicle driver, it is important to compensate the mutual influence among the torque steers resulted from the causes as described above.

SUMMARY OF THE INVENTION

Accordingly, it is an object of the present invention to provide a steering control apparatus for reducing torque steer, which will be caused when a traction control is performed, without giving a different feeling to a vehicle driver.

And, it is another object of the present invention to compensate an influence by the torque steer resulted from drive shafts, in the case where the torque steer resulted from driving force distribution, or torque steer resulted from traction control is caused, to provide the torque steer without giving the different feeling to the vehicle driver.

In accomplishing the above and other objects, the steering control apparatus is provided for a vehicle having a steering wheel for steering a pair of right and left steered wheels of the vehicle, a power source for generating power, drive shafts for transferring the power to the right and left steered wheels, to be served as right and left driving wheels of the vehicle, respectively, and a traction control device for controlling braking torque applied to the right and left steered wheels, respectively. The apparatus comprises a braking torque detection device for detecting the braking torque applied to the right and left steered wheels, respectively, a driving force difference calculation device for calculating a driving force difference between the right and left steered wheels, on the basis of the braking torque applied to each of the right and left steered wheels detected by the braking torque detection device, a power source state detection device for detecting an actuating state of the power source, a steering torque control device for controlling steering torque created by the steering wheel, and applying torque steer reducing torque to the steering wheel, to reduce torque steer, and a desired value determination device for determining a desired value of the torque steer reducing torque, on the basis of the driving force difference calculated by the driving force difference calculation device, and the actuating state of the power source detected by the power source state detection device. And, the steering torque control device is adapted to apply the torque steer reducing torque to the steering wheel, in accordance with the desired value of the torque steer reducing torque determined by the desired value determination device, to reduce the torque steer.

Preferably, the desired value determination device may determine the desired value of the torque steer reducing torque in accordance with a first characteristic for determining the desired value, when a sign of the driving force difference is positive, and determine the desired value of the torque steer reducing torque in accordance with a second characteristic for determining the desired value, when the sign of the driving force difference is negative, which is different from the first characteristic.

The steering control apparatus may further comprise a driving force calculation device for calculating the driving force transferred to the driving wheels through the drive shafts, and at least one of the first characteristic for determining the desired value and the second characteristic for determining the desired value may be modified, on the basis of the driving force calculated by the driving force calculation device.

The first characteristic for determining the desired value may be modified to be relatively large, when the driving force calculated by the driving force calculation device is relatively large, and the first characteristic for determining the desired value may be modified to be relatively small, when the driving force calculated by the driving force calculation device is relatively small. The desired value of the torque steer reducing torque may be determined in accordance with the first characteristic, when the sign of the driving force difference is positive, and the first characteristic may be provided according to the driving force difference multiplied by a first constant, which is provided to be increased, with the driving force being increased. And, the desired value of the torque steer reducing torque may be determined in accordance with the second characteristic, when the sign of the driving force difference is negative, and the second characteristic may be provided according to the driving force difference multiplied by a second constant, which is provided to be decreased, with the driving force being increased.

Also, in accomplish the another object as described above, the steering control apparatus, which is provided for the vehicle having the steering wheel, power source, drive shafts, and traction control device as described above, comprises a driving force distribution detection device for detecting a driving force distribution between the right and left steered wheels, a driving force difference calculation device for calculating a driving force difference between the right and left steered wheels, on the basis of the driving force distribution detected by the driving force distribution detection device, a power source state detection device for detecting an actuating state of the power source, a driving force calculation device for calculating the driving force, on the basis of the actuating state of the power source detected by the power source state detection device, a steering torque control device for controlling steering torque created by the steering wheel, and applying torque steer reducing torque to the steering wheel, to reduce torque steer, first desired value determination device for determining a first desired value of the torque steer reducing torque, on the basis of the driving force difference calculated by the driving force difference calculation device, a second desired value determination device for determining a second desired value of the torque steer reducing torque, on the basis of the driving force calculated by the driving force calculation device, and a modifying device for modifying the first desired value of the torque steer reducing torque determined by the first desired value determination device, in accordance with the second desired value of the torque steer reducing torque determined by the second desired value determination device, to provide the desired value of the torque steer reducing torque.

Preferably, the steering torque control device determines to start controlling the torque steer reducing torque, on the basis of the driving force calculated by the driving force calculation device.

The steering control apparatus may further comprise a modified value calculation device for calculating a modified value of the torque steer reducing torque, on the basis of the driving force calculated by the driving force calculation device. And, the modifying device is adapted to modify the second desired value of the torque steer reducing torque determined by the second desired value determination device, by adding the modified value of the torque steer reducing torque to the second desired value of the torque steer reducing torque.

BRIEF DESCRIPTION OF THE DRAWINGS

The above stated object and following description will become readily apparent with reference to the accompanying drawings, wherein like referenced numerals denote like elements, and in which.

DETAILED DESCRIPTION OF EMBODIMENTS

Figure 1:
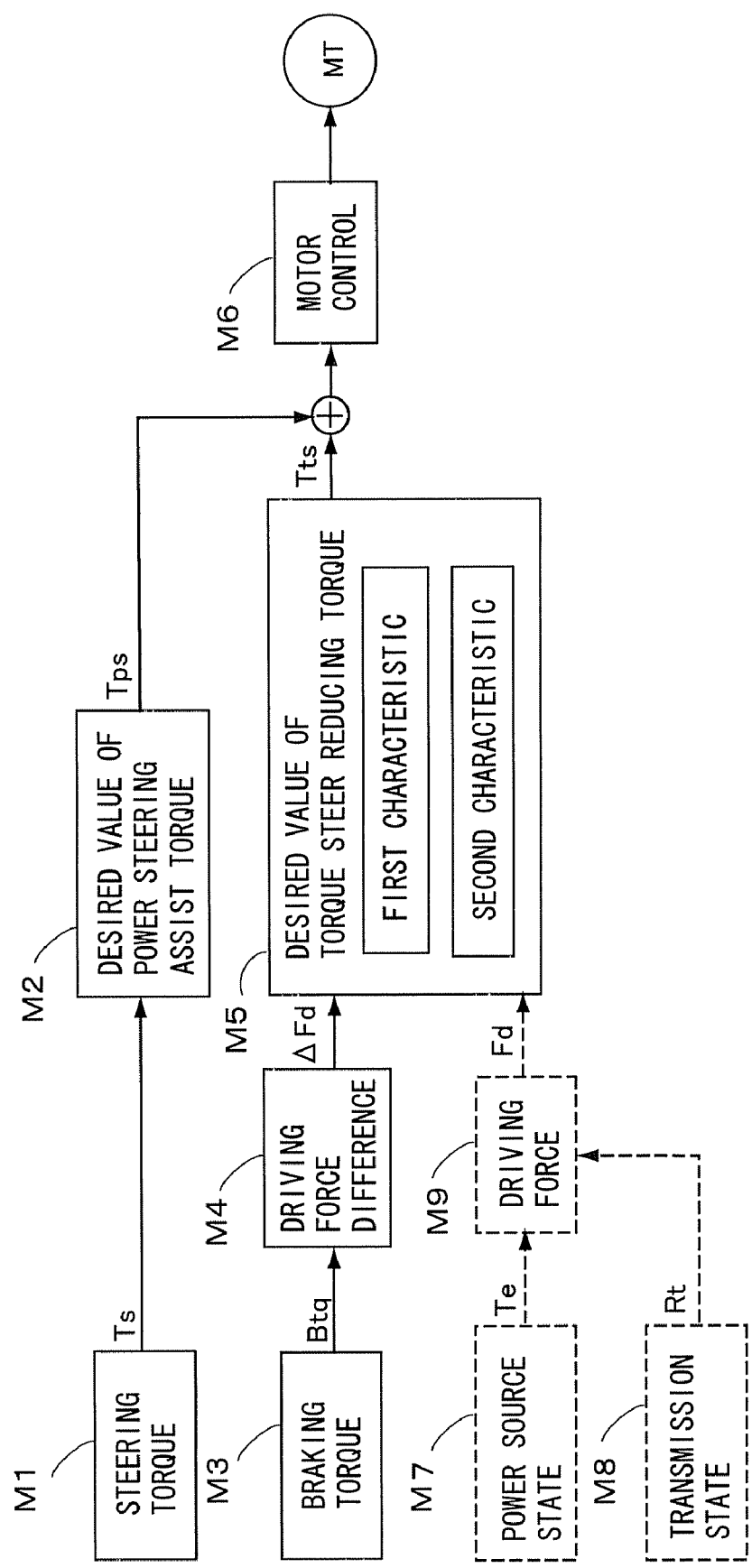
FIG. 1 is a schematic block diagram of a steering control apparatus according to an embodiment of the present invention.
Figure 2:
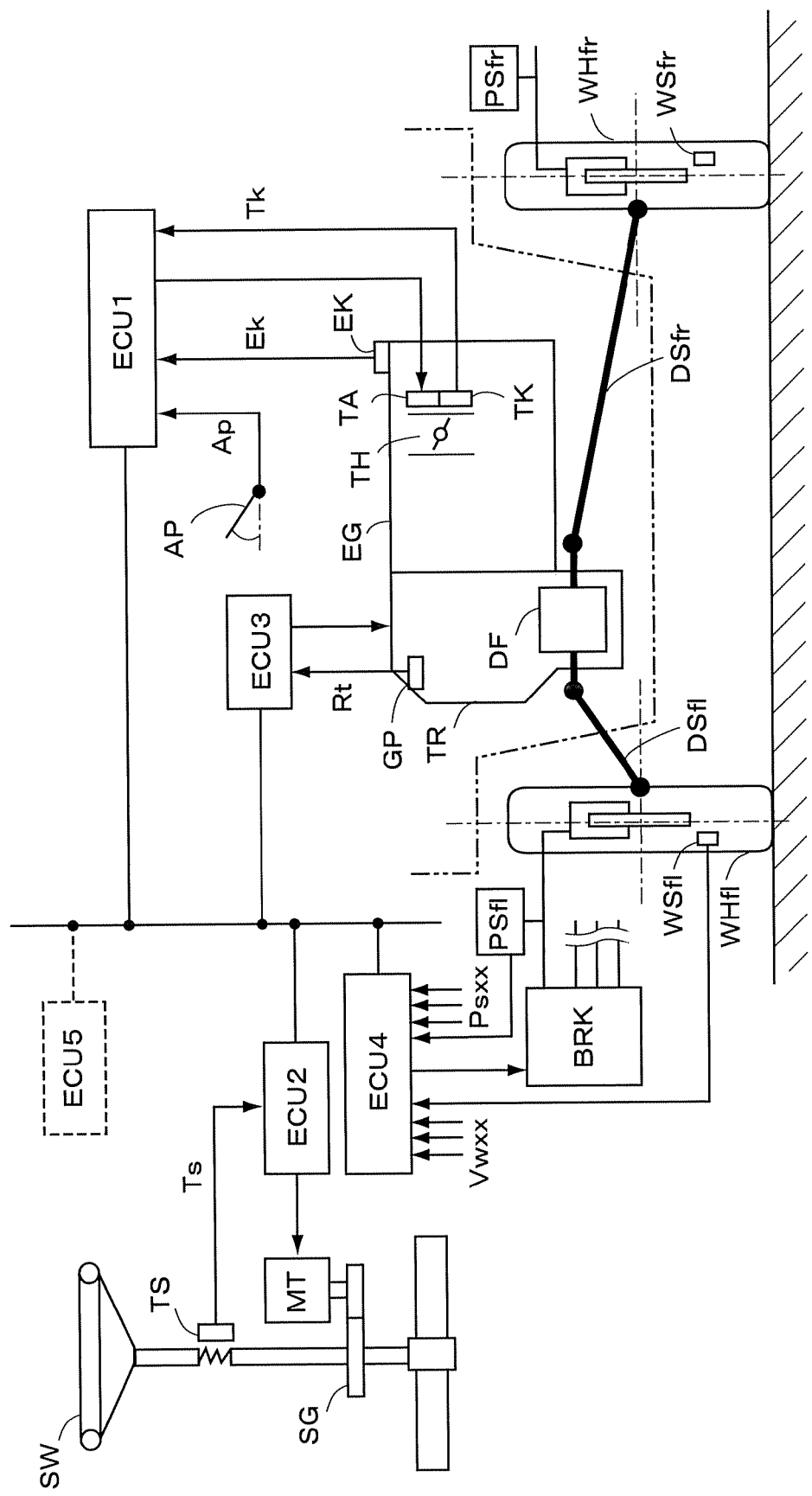
FIG. 2 is a schematic block diagram of a vehicle having a steering control apparatus according to an embodiment of the present invention.

Referring to FIG. 1, there is schematically illustrated a steering control apparatus according to an embodiment of the present invention, which is installed in a vehicle as shown in FIG. 2, for example. That is, the apparatus is installed in the vehicle, which includes a steering wheel SW adapted to steer a pair of wheels WHfr and WHfl served as right and left steered wheels, an engine EG served as a power source for generating power, and drive shafts DSfr and DSfl adapted to transfer the power to the wheels WHfr and WHfl, which are also served as right and left driving wheels. The apparatus includes a steering torque control device, wherein steering wheel torque (simply referred to as steering torque) (Ts) of the steering wheel SW is detected by a steering torque detection device M1 as shown in FIG. 1, and on the basis of the detected result, a desired value of torque served as an assist torque for assisting the power steering control to reduce the steering force applied by the vehicle driver, is calculated by an assist torque desired value determination device M2 for determining the desired value of power steering assist torque, to output a desired value (Tps) of the assist torque.

According to the present embodiment, the apparatus is provided with a traction control device, which is adapted to control braking torque applied to the right and left steered wheels WHfr and WHfl, respectively, by means of a brake control device (BRK in FIG. 2). And, the braking torque applied to the wheels WHfr and WHfl is detected by a braking torque detection device M3, respectively. As for the braking torque detection device M3, may be employed hydraulic pressure sensors, as indicated by PSfr and PSfl in FIG. 2, which are provided for detecting wheel cylinder pressure at each wheel. Or, even if the hydraulic pressure sensors are not provided, the braking torque can be calculated by known methods on the basis of actuating state of the brake control device. Furthermore, may be used a desired value of wheel cylinder pressure calculated for the traction control in an electronic brake control unit (indicated by ECU4 in FIG. 2), which will be described later. The brake control device is not limited to the one for applying the braking torque by the hydraulic pressure as described above, but an electric brake device (not shown) may be used. In the latter case, the object to be detected by the braking torque detection device M3 will be the output or input of an electric motor for actuating the electric brake device, so that a desired value for controlling the electric motor may be used.

In the case where the right and left driving wheels WHfr and WHfl are connected with each other through a differential gear, if the braking torque is applied to one wheel, driving force corresponding to the braking torque will be applied to the other one wheel. For example, if the braking torque (Btq) is applied to the right driving wheel WHfr, the driving force of the left driving wheel WHfr will be increased by the amount of (Btq/r), where "r" is a radius of the wheel. On the basis of this relationship, therefore, a driving force difference ($\Delta Fd$) can be calculated by a driving force difference calculation device M4. Then, on the basis of the driving force difference ($\Delta Fd$), a desired value (Tts) of the torque steer reducing torque is determined by a desired value determination device M5.

In the desired value determination device M5, there is provided a characteristic for determining the desired value of the torque steer reducing torque, which indicates the relationship between the driving force difference ($\Delta Fd$) and the desired value (Tts) of the torque steer reducing torque, so that the desired value (Tts) is set, with reference to the characteristic. As for the characteristic for determining the desired value of the torque steer reducing torque, different characteristics are set in accordance with the sign of the driving force difference ($\Delta Fd$), in view of the aforementioned characteristic resulted from the drive shafts, such as a first characteristic for determining the desired value and a second characteristic for determining the desired value, which will be described later in detail. For example, the sign of the driving force difference ($\Delta Fd$) for creating the torque steer resulted from the traction control in the same steered direction as the steered direction created by the torque steer resulted from the drive shafts is set to provide a characteristic with relatively large value. On the contrary, the sign of the driving force difference ($\Delta Fd$) for creating the torque steer resulted from the traction control in the opposite steered direction to the steered direction created by the torque steer resulted from the drive shafts is set to provide a characteristic with relatively small value.

The desired value (Tts) of the torque steer reducing torque is added to the desired value (Tps) of the assist torque obtained by the assist torque desired value determination device M2, to output a new desired value, based on which the electric motor MT is controlled by a motor control device M6. Consequently, the torque steer reducing control is performed according to a map of torque steer characteristic, which is different depending upon the right and left steering directions, taking the torque steer resulted from the drive shafts into consideration, so that the torque steer resulted from the traction control will be reduced. Therefore, a reducing rate of the torque steer is made constant, with the braking torque being given to the front and right wheels at the time of traction control, so that the different feeling to the vehicle driver can be restrained.

Furthermore, as indicated by broken lines in FIG. 1, it may be so constituted that the driving force (Fd) is calculated on the basis of the results detected by a power source state detection device M7 for detecting an actuating state of the power source, and a transmission state detection device M8 for detecting an actuating state of the transmission, to modify the map of the torque steer characteristic on the basis of the driving force (Fd). In FIG. 1, an output (Te) indicative of the actuating state of the power source is detected by the power source state detection device M7. As for the power source in the present invention, known devices for generating the driving force for driving the wheels may be employed. For example, in addition to an internal combustion engine such as a gasoline engine (EG in FIG. 2), diesel engine or the like, may be employed an electric motor, and a combination of them used in a device (called as a hybrid system). Thus, the power source state detection device M7 is the device for detecting information such as a throttle opening, amount of injected fuel, engine speed or the like according to the internal combustion engine, and the device for detecting driving current or voltage according to the electric motor. Furthermore, the detection device may be mounted directly on the output axis of the power source.

As for the transmission state detection device M8, a speed reducing gear ratio (Rt) of the transmission TR as shown in FIG. 2 is detected as the transmission state. And, in a driving force calculation device M9, the driving force (Fd) transmitted by the drive shafts, also called as "driving torque", is calculated on the basis of the power source output (Te) or speed reducing gear ratio (Rt). Then, based on the driving force (Fd), the map of the torque steer characteristic is modified as follows. That is, if the driving force (Fd) is large, the characteristic for determining the desired value is modified to be relatively large in the steered direction for increasing the torque steer, whereas the characteristic is modified to be relatively small in the steered direction to be cancelled. On the other hand, if the driving force (Fd) is small, the characteristic is modified to be relatively small in the steered direction for increasing the torque steer, whereas the characteristic is modified to be relatively large in the steered direction to be cancelled. Thus, since the torque steer resulted from the drive shafts is varied in accordance with the driving force transmitted by the drive shafts, as described above, if it is so constituted that the driving torque is calculated on the basis of the power source output or gear ratio, to modify the map of the torque steer characteristic on the basis of the driving torque, more accurate torque steer reducing control can be achieved.

The steering control apparatus is installed in the vehicle as shown in FIG. 2, and the engine EG is installed transversely in the engine compartment together with the transmission TR. Within the transmission TR, a differential device DF is disposed, to distribute the power generated by the engine EG to the wheels WHfr and WHfl, which are served as the steered wheels and driving wheels. In the vehicle, an electronic engine control unit ECU1 for controlling the engine EG, an electronic steering control unit ECU2 for controlling the steering system, and an electronic transmission control unit ECU3 for controlling the transmission, and an electronic brake control unit ECU4 for controlling a brake system are connected to one another through a communication bus, so that sensor signals and the information for each control unit can be provided commonly. The engine EG is provided with a throttle valve TH for controlling an engine output. The opening of the throttle valve TH is adjusted by a throttle actuator TA, and its throttle opening (Tk) is detected by a throttle opening sensor TK. Also, an engine speed sensor EK is provided for detecting an engine rotational speed (Ek). And, the vehicle driver's requirement for acceleration is detected by an accelerator pedal sensor AP, as the amount of operation (Ap) of an accelerator pedal (not shown). On the basis of the detected results such as the amount of operation (Ap) of the accelerator pedal, engine rotational speed (Ek) and throttle opening (Tk), therefore, the throttle actuator TA is controlled by the electronic engine control unit ECUL. According to the present embodiment, the vehicle is provided with the gasoline engine EG as the power source, while known power sources for generating the power may be employed, including an internal combustion engine such as the diesel engine or the like, an electric motor used in an electric vehicle (abbreviated as "EV"), and a combination of them used in a hybrid vehicle (abbreviated as "HEV").

As for the steering system, the steering torque applied to the steering wheel SW is controlled, on the basis of the result detected by the steering torque sensor TS. In practice, the electronic steering control unit ECU2 is so constituted that the electric motor MT is controlled in response to the steering torque (Ts) detected by the steering torque sensor TS. Also, it may be so constituted that the electric motor MT is controlled, taking the vehicle speed (Vx) into consideration. This control is a so-called power steering control, and may be called as an electric power steering control, because the electric motor MT is used. Furthermore, when the vehicle is accelerated, for example, created is the torque steer phenomenon, wherein the wheels WHfr and WHfl are forced to steer the steering wheel SW. The torque steer reducing torque for reducing the torque steer phenomenon is provided by the electric motor MT, as described later. The control for reducing the torque steer is called as "torque steer reducing control". In the transmission TR, a gear position sensor GP is disposed for detecting the gear ratio (Rt), which is output to the electronic transmission control unit ECU3. As for the transmission TR, known transmissions such as a manual transmission, automatic transmission, continuously variable transmission (CVT) or the like may be used.

In the vehicle having a traction control function, the brake control device BRK is provided for controlling the brake torque applied to each wheel, and the electronic brake control unit ECU4 for controlling the device is connected to the communication bus. To the electronic brake control unit ECU4, connected are wheel speed sensors WSxx, wherein "xx" designates each wheel, i.e., "fr" designates the wheel at the front right side as viewed from the position of a driver's seat, "fl" designates the wheel at the front left side, "rr" designates the wheel at the rear right side, and "rl" designates the wheel at the rear left side. On the basis of the detected wheel speeds, the vehicle speed (Vx) is calculated. According to the electronic brake control unit ECU4, therefore, the wheel speed (Vwxx) is being watched, and if the acceleration slips of the wheels WHfr and WHfl served as the driving wheels have become large, the traction control will be performed. That is, the output of the engine EG will be reduced, and the braking torque will be applied to the wheels WHfr and WHfl, thereby to restrain the acceleration slip. In each wheel cylinder, a hydraulic pressure sensor PSxx is disposed, to detect the wheel cylinder pressure for each wheel.

Figure 3:
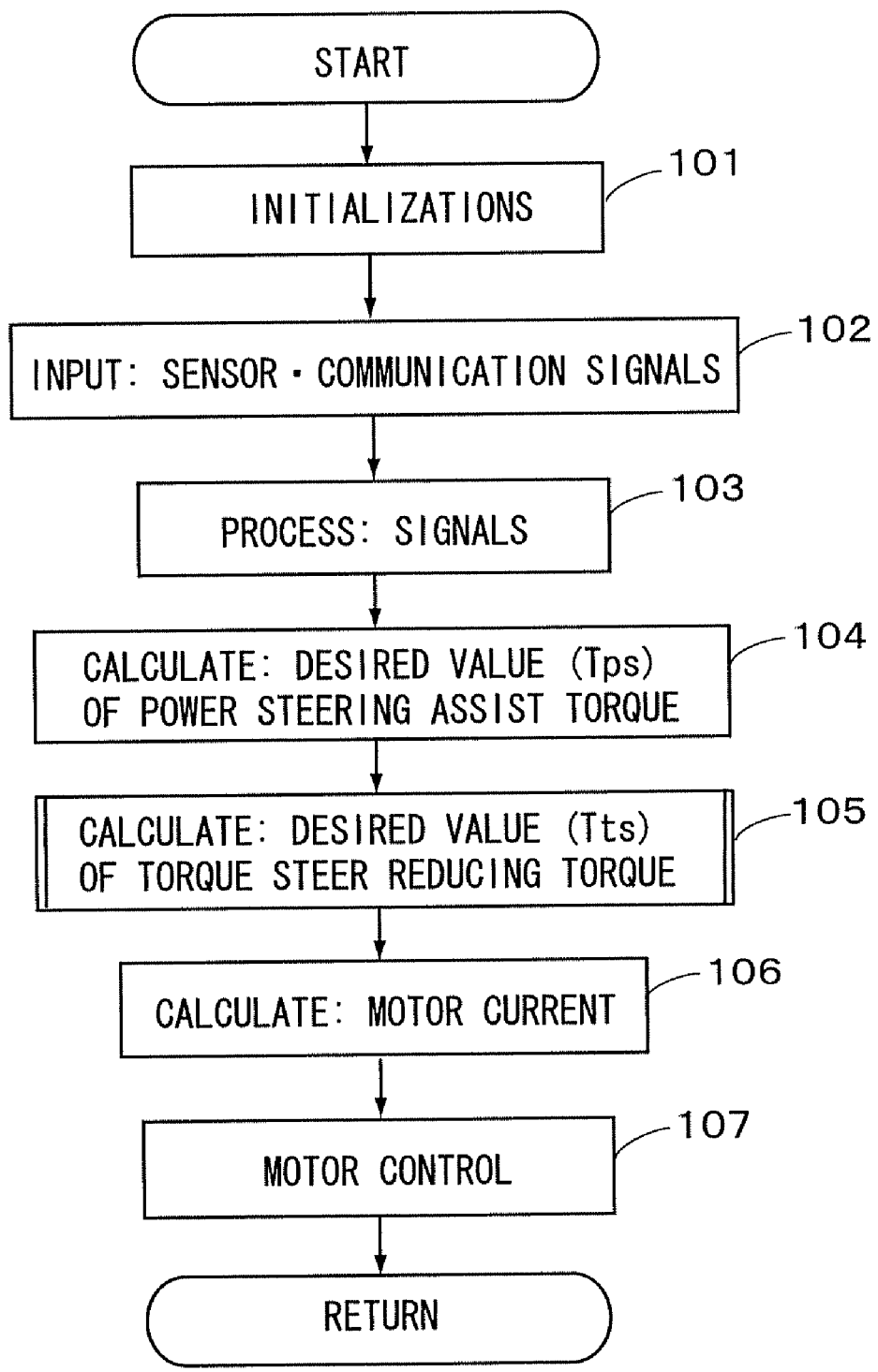
FIG. 3 is a flowchart of an example of steering control according to an embodiment of the present invention.

Next will be explained operation of the steering control apparatus as constituted above, referring to the flowchart as shown in FIG. 3. At the outset, the program provides for initialization of the system at Step 101, and the signals detected by various sensors and communication signals on the communication bus are read at Step 102. Then, the program proceeds to Step 103, where the signals are processed by filtering or the like. Next, at Step 104, the desired value (Tps) of the assist torque provided for the power steering control is calculated on the basis of steering torque (Ts). Then, the program proceeds to Step 105, where the desired value (Tts) of the torque steer reducing torque is calculated, as will be explained later with reference to FIG. 4. The program further proceeds to Step 106, where the desired value (Tts) of the torque steer reducing torque is added to the desired value (Tps) of the assist torque, to provide a new desired value (Tps+Tts), so that a current command value to the electric motor MT is calculated on the basis of the new desired value. Then, on the basis of the current command value, the electric motor MT is controlled at Step 107.

Figure 4:
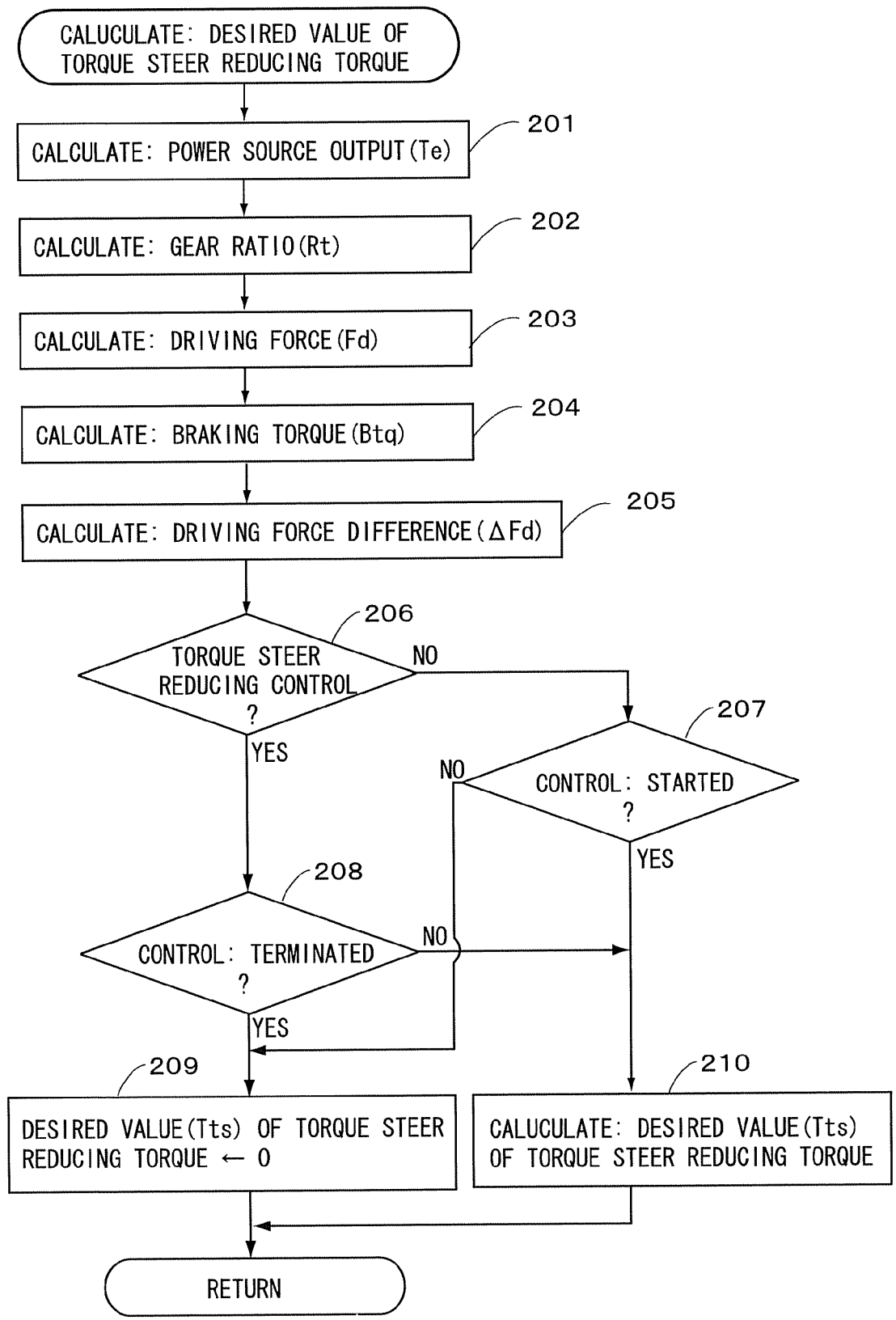
FIG. 4 is a flowchart of an example for calculating a desired value of torque steer reducing torque according to an embodiment of the present invention.
Figure 5:
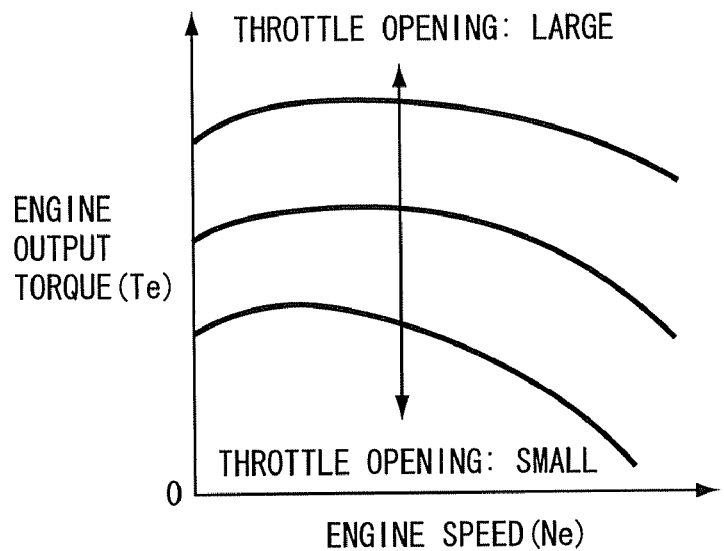
FIG. 5 is diagram showing an example of a map for providing torque steer reducing control starting conditions according to an embodiment of the present invention.

The desired value (Tts) of the torque steer reducing torque as described above is calculated according to the flowchart as shown in FIG. 4. At the outset, the output (Te) of the engine EG served as the power source is calculated at Step 201, on the basis of the sensor signals and communication signals read at Step 102 in FIG. 3. The output (Te) is calculated according to a relationship between the engine speed (Ne) and throttle opening (Tk) as shown in FIG. 5, for example. Then, at Step 202, the gear ratio (Rt) is calculated on the basis of the result detected by the gear position sensor GP of the transmission TR. And, the driving force (Fd) transmitted through the drive shafts is calculated at Step 203, on the basis of the output (Te) of the power source and the gear ratio (Rt) of the transmission.

Next, calculated at Step 204 is the braking torque (Btq) applied to the driving wheels according to the traction control. In the case where the hydraulic pressure sensor PSxx is provided as shown in FIG. 2, the braking torque (Btq) can be calculated by use of the detected signal, i.e., wheel cylinder pressure (Psxx). In the case where the hydraulic pressure sensor PSxx has not been provided, the braking torque (Btq) can be calculated according to an operating state of the brake control device BRK, e.g., actuating states of solenoid valves or the like, by a known process. Furthermore, the braking torque (Btq) can be calculated by use of the desired value of wheel cylinder pressure for the traction control, which is calculated in the electronic brake control unit ECU4. In the case where an electric brake device (not shown) is installed, it can be calculated on the basis of the electric current for actuating an electric motor provided in the device. Or, it can be calculated by use of a desired value for controlling the electric motor.

And, at Step 205, the driving force difference (ΔFd) is calculated on the basis of the braking torque (Btq) as described above. This driving force difference (ΔFd) is processed as the one with a positive or negative sign, which indicates which wheel is larger in driving force between the right and left driving wheels. For example, provided that the sign of the driving force difference is set to be positive when the driving force of the left driving wheel is larger than the driving force of the right driving wheel, the sign of the driving force difference is set to be negative when the driving force of the right driving wheel is larger than the driving force of the left driving wheel. Thus, since the sign of the driving force difference (ΔFd) indicates which wheel is increased in driving force between the right and left wheels, according to the traction control, the sign of the driving force difference (ΔFd) also indicates the steered direction for creating the torque steer resulted from the traction control.

Then, it is determined at Step 206, whether the torque steer reducing control is being performed, or not. If it is determined that the control is not being performed, the program proceeds to Step 207, where it is determined whether the torque steer reducing control is to be started, or not. With respect to the determination whether the torque steer reducing control is to be started, if the traction control is being performed, and the driving force (Fd) is equal to or greater than a predetermined value (Fd1), it is determined that the torque steer reducing control is to be started. If it is determined that the torque steer reducing control is to be started, the program proceeds to Step 210, where the desired value (Tts) of the torque steer reducing torque is calculated, and the torque steer reducing control is performed. Instead, if it is determined at Step 207 that the torque steer reducing control is not required, the program proceeds to Step 209, where the desired value (Tts) of the torque steer reducing torque is set to be zero (0).

On the other hand, if it is determined at Step 206 that the torque steer reducing control is being performed, the program proceeds to Step 208, where it is determined whether the torque steer reducing control is to be terminated, or not. With respect to the determination whether the torque steer reducing control is to be terminated, if the traction control is not being performed (prohibited state), and the driving force (Fd) is smaller than a predetermined value (Fd2), it is determined that the torque steer reducing control is to be terminated. Accordingly, if it is determined at Step 208 that the torque steer reducing control is not to be terminated, the program proceeds to Step 210, where the desired value (Tts) of torque steer reducing torque is continuously calculated. And, if the conditions for terminating the torque steer reducing torque are fulfilled, the program proceeds to Step 209, where the desired value (Tts) of the torque steer reducing torque is set to be zero.

Figure 6:
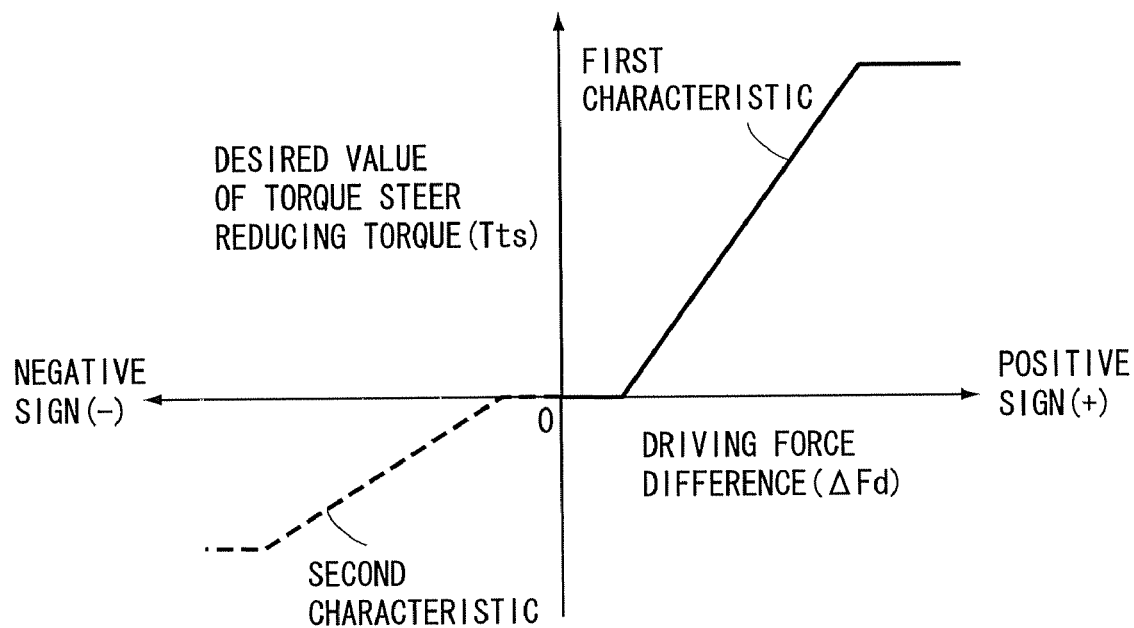
FIG. 6 is a diagram showing an example of a map for providing a desired value of torque steer reducing torque, according to an embodiment of the present invention.

The calculation of the desired value (Tts) of the torque steer reducing torque executed at Step 210, is made on the basis of the driving force difference (ΔFd) calculated at Step 205, according to a characteristic as shown in FIG. 6, for example. FIG. 6 shows a case where the steered direction of the torque steer resulted from the drive shafts provided in advance as the vehicle characteristic, is the same as the steered direction of the torque steer resulted from the traction control provided when the driving force difference (ΔFd) is of the positive sign, and opposite to the steered direction of the torque steer resulted from the traction control provided when the driving force difference (ΔFd) is of the negative sign. Hereinafter, the relationship in magnitude of the characteristics will be explained, with the relationship being based on the magnitude in absolute value, to simplify the explanation.

The desired value (Tts) of the torque steer reducing torque is determined in accordance with a first characteristic for determining the desired value of the torque steer reducing torque, hereinafter called as first desired value characteristic, as indicated by a solid line in the first quadrant in FIG. 6, and a second characteristic for determining the desired value of the torque steer reducing torque, hereinafter called as second desired value characteristic, as indicated by a broke line in the third quadrant in FIG. 6, which is different from the first desired value characteristic. Then, the first desired value characteristic provided when the driving force difference (ΔFd) is of the positive sign, is set to be the relatively large characteristic, whereas the second desired value characteristic provided when the driving force difference (ΔFd) is of the negative sign, is set to be the relatively small characteristic.

In the case where the steered direction of the torque steer resulted from the drive shafts is the same as the steered direction of the torque steer resulted from the traction control, i.e., when the driving force difference (ΔFd) is of the positive sign in FIG. 6, the torque steer resulted from the traction control will be increased by the torque steer resulted from the drive shafts. In this case, the characteristic for determining the desired value is set to be relatively large, to provide the desired value (Tts) of the torque steer reducing torque with relatively large absolute value against the driving force difference (ΔFd). In contrast, in the case where the steered direction of the torque steer resulted from the drive shafts is opposite to the steered direction of the torque steer resulted from the traction control, i.e., when the driving force difference (ΔFd) is of the negative sign in FIG. 6, the torque steer resulted from the traction control will be cancelled by the torque steer resulted from the drive shafts. In this case, therefore, the characteristic for determining the desired value is set to be relatively small, to provide the desired value (Tts) of the torque steer reducing torque with relatively small absolute value against the driving force difference (ΔFd). Thus, with the characteristic for determining the desired value for use in calculating the desired value (Tts) of the torque steer reducing torque being provided to be different, i.e., between the first desired value characteristic and the second desired value characteristic, depending on the sign of the driving force difference (ΔFd), the influence by the torque steer resulted from the drive shafts can be restrained effectively.

Figure 7:
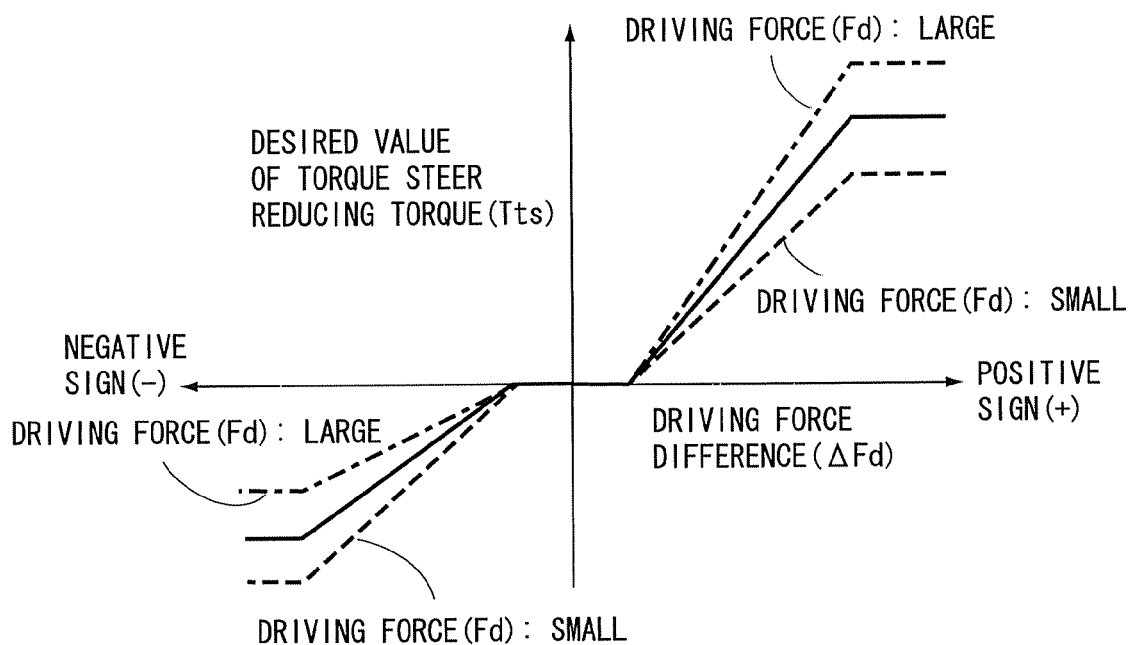
FIG. 7 is a diagram showing another example of a map for providing a desired value of torque steer reducing torque, according to an embodiment of the present invention.

Furthermore, as shown in FIG. 7, the first desired value characteristic and the second desired value characteristic may be modified or changed in accordance with the driving force (Fd) calculated at Step 203. In this case, the first desired value characteristic with the sign of the driving force difference (ΔFd) being positive may be modified to be relatively large, as indicated by a one-dot chain line in FIG. 7, when the driving force (Fd) is relatively large, whereas it may be modified to be relatively small, as indicated by a broken line in FIG. 7, when the driving force (Fd) is relatively small, as will be explained in detail hereinafter.

At the outset, when the driving force (Fd) is large, the torque steer resulted from the drive shafts will become large. Then, according to the first desired value characteristic, the steered direction for creating the torque steer resulted from the drive shafts is the same as the steered direction for creating the torque steer resulted from the traction control, whereby the torque steer resulted from the traction control will be increased by the torque steer resulted from the drive shafts. Therefore, when the driving force (Fd) is large, the first desired value characteristic may be modified to be relatively large, to output the desired value of the torque steer reducing torque to be of a relatively large value. Whereas, when the driving force (Fd) is small, the first desired value characteristic may be modified to be relatively small, to output the desired value of the torque steer reducing torque to be of a relatively small value.

On the contrary, according to the second desired value characteristic with the sign of the driving force difference (ΔFd) being negative, when the driving force (Fd) is relatively large, the second desired value characteristic may be modified to be relatively small, as indicated by the one-dot chain line in FIG. 7, whereas it may be modified to be relatively large, as indicated by the broken line in FIG. 7, when the driving force (Fd) is relatively small, as will be explained in detail hereinafter. At the outset, when the driving force (Fd) is small, the torque steer resulted from the drive shafts will become small. And, according to the second desired value characteristic, the steered direction for creating the torque steer resulted from the drive shafts is opposite to the steered direction for creating the torque steer resulted from the traction control, whereby the torque steer resulted from the traction control will be cancelled by the torque steer resulted from the drive shafts. Therefore, when the driving force (Fd) is small, the second desired value characteristic may be modified to be relatively large, to output the desired value of the torque steer reducing torque to be of a relatively large value. Whereas, when the driving force (Fd) is large, the second desired value characteristic may be modified to be relatively small, to output the desired value of the torque steer reducing torque to be of a relatively small value.

As described above, with the first desired value characteristic and the second desired value characteristic being modified or changed in accordance with the driving force (Fd), the torque steer resulted from the drive shafts, which is affected by the magnitude of the driving force transferred by the drive shafts, can be compensated, to achieve the torque steer reducing control accurately. Therefore, the torque steer, which is created when the vehicle is accelerated, and which is provided for the steered wheel forcing the steering wheel to be steered, can be reduced appropriately without giving a different feeling to the vehicle driver.

Figure 8:
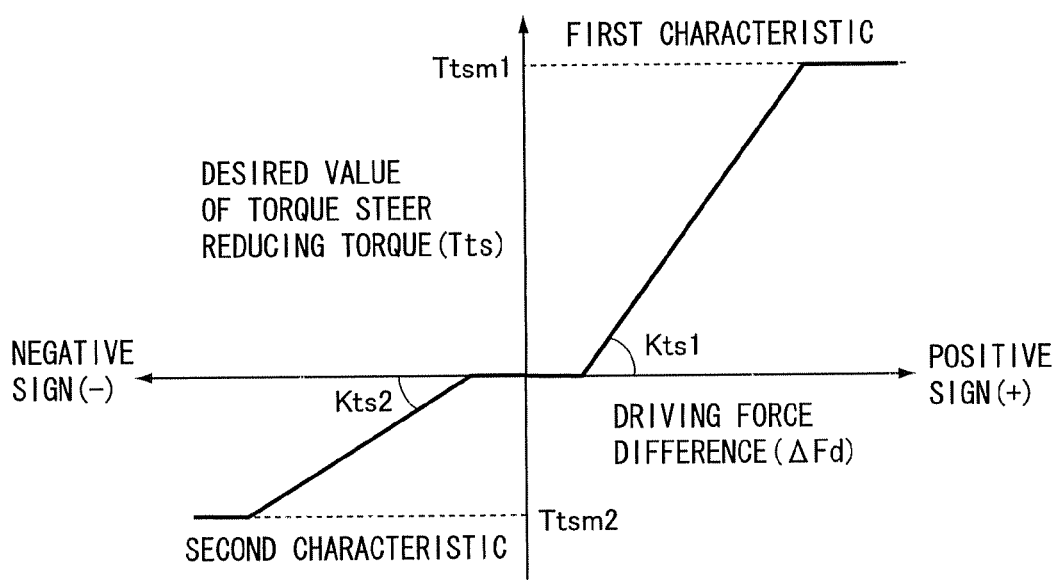
FIG. 8 is a diagram showing a further example of a map for providing a desired value of torque steer reducing torque, according to an embodiment of the present invention.
Figure 9:
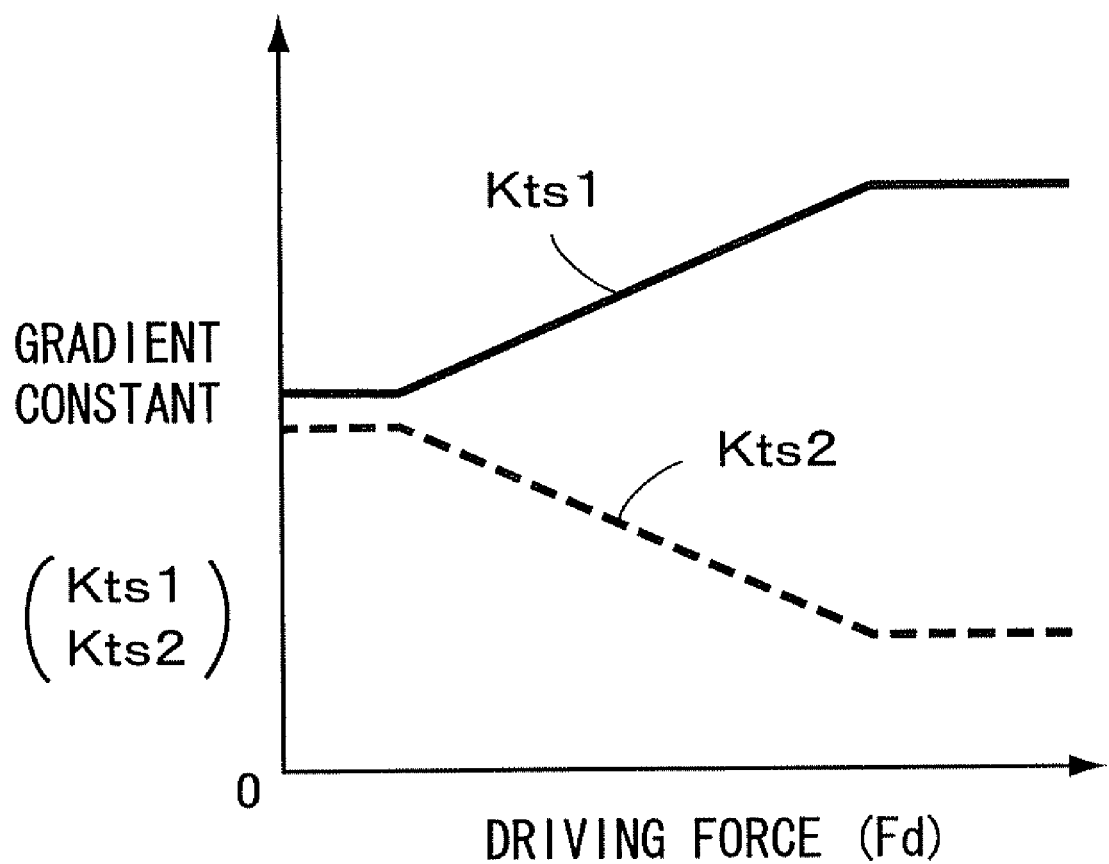
FIG. 9 is a diagram showing an example of a map for providing a gradient constant used in FIG. 8.

Furthermore, the first desired value characteristic and the second desired value characteristic may be provided by use of a function as shown in FIG. 8. Also, the first desired value characteristic and the second desired value characteristic may be provided as a function with a dead zone, in proportion to the driving force difference (ΔFd). For example, when the desired value of the torque steer reducing torque is determined in accordance with the first desired value characteristic, i.e., the driving force difference (ΔFd)>0, the desired value of the torque steer reducing torque is calculated according to the equation of [Tts=Kts1(Fd)·ΔFd−a], wherein "Kts1(Fd)" is a constant indicative of a gradient, to provide a characteristic in accordance with the driving force (Fd) as shown in FIG. 9, and "a" is a constant indicative of the dead zone. The gradient constant (Kts1) is set to indicate a characteristic to be increased, with the driving force (Fd) being increased, as indicated by a solid line in FIG. 9. And, in case of Tts≦0, it is set to be zero, i.e., Tts=0.

On the other hand, when the desired value of the torque steer reducing torque is determined in accordance with the second desired value characteristic, i.e., the driving force difference (ΔFd)<0, the desired value of the torque steer reducing torque is calculated according to the equation of [Tts=Kts2(Fd)·ΔFd+b], wherein "Kts2(Fd)" is a constant indicative of a gradient, to provide a characteristic in accordance with the driving force (Fd) as shown in FIG. 9, and "b" is a constant indicative of the dead zone. The gradient constant (Kts2) is set to indicate a characteristic to be decreased, with the driving force (Fd) being increased, as indicated by a broken line in FIG. 9.

Particularly, the gradient constant (Kts1) is set to be larger the gradient constant (Kts2), so that the first desired value characteristic will be relatively larger in value than the second desired value characteristic. As a result, the influence affected by the torque steer resulted from the drive shafts can be compensated effectively. Furthermore, with the gradient constant (Kts1) and (Kts2) being modified in accordance with the driving force (Fd) as shown in FIG. 9, the influence affected by variation of the torque steer resulted from the drive shafts can be compensated effectively. When the desired value (Tts) of the torque steer reducing torque is calculated, a linear characteristic to the driving force difference (ΔFd) has been employed in FIG. 8. Instead, a characteristic bent at a point, or curved characteristic may be employed. As shown in FIG. 8, Ttsm1 and Ttsm2 may be provided as the limited values, wherein they are set to meet |Ttsm1|>|Ttsm2|.

In the above embodiment, there is assumed the case where the steered direction of the torque steer resulted from the drive shafts is the same as the steered direction of the torque steer resulted from the traction control provided when the driving force difference (ΔFd) is of the positive sign, and opposite to the steered direction of the torque steer resulted from the traction control provided when the driving force difference (ΔFd) is of the negative sign. And, the first desired value characteristic is set to be a relatively large characteristic, whereas the second desired value characteristic is set to be a relatively small characteristic. On the contrary, in the case where the steered direction of the torque steer resulted from the drive shafts is the same as the steered direction of the torque steer resulted from the traction control provided when the driving force difference (ΔFd) is of the negative sign, and opposite to the steered direction of the torque steer resulted from the traction control provided when the driving force difference (ΔFd) is of the positive sign, the first desired value characteristic and the second desired value characteristic as described above may be replaced with each other.

Figure 10:
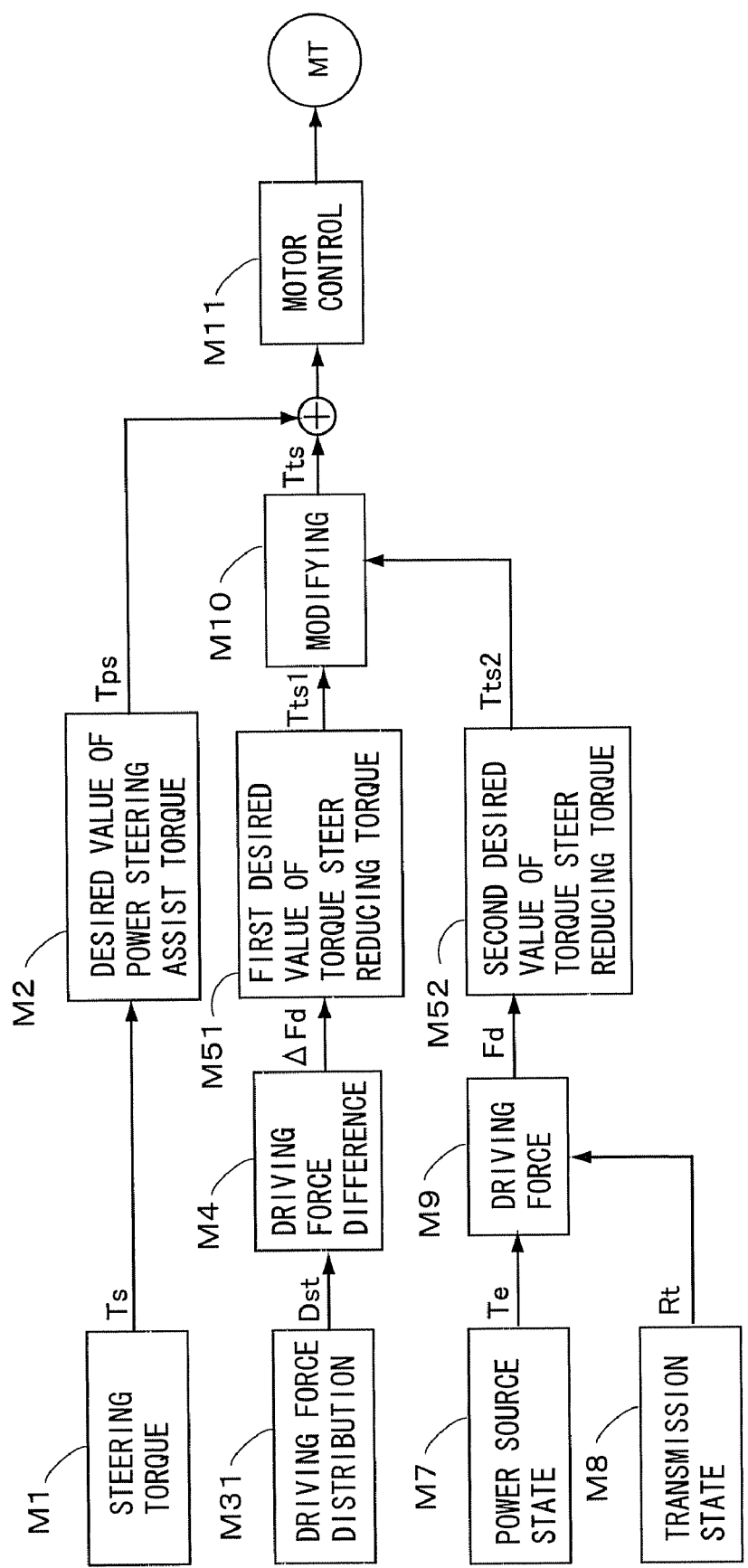
FIG. 10 is a schematic block diagram of a steering control apparatus according to another embodiment of the present invention.

Next will be explained another embodiment of the present invention referring to FIGS. 10-18, wherein the same reference numerals denote the same elements as those disclosed in FIGS. 1-9. In FIG. 10, there is schematically illustrated a steering control apparatus according to another embodiment of the present invention, which is installed in the vehicle as shown in FIG. 2. According to the present embodiment, the apparatus is provided with a driving force distribution detection device M31, which detects a driving force distribution state (Dst) distributed to the right and left driving wheels, i.e., steered wheels in the present embodiment. In the driving force difference calculation device M4, therefore, the driving force difference (ΔFd) is calculated on the basis of the distribution state (Dst) detected by the driving force distribution detection device M31, which is adapted to detect the braking torque applied to the driving wheel, if the traction control is performed. Therefore, the driving force distribution detection device M31 may be provided for detecting or estimating the hydraulic braking pressure, as described before. According to a limited slip differential, a differential state may be detected, to detect the driving force distribution state. Therefore, wheel speed sensors (WSfr and WSfl in FIG. 2) for detecting the wheel speeds of the driving wheels WHfr and WHfl, respectively, may be served as the driving force distribution detection device M31. In the case where an electronic driving force distribution device (not shown) is installed in the vehicle, an electronic control unit ECU5 (indicated by a broken line in FIG. 2) for controlling the distribution device may be served as the driving force distribution detection device M31. Then, on the basis of the driving force difference (ΔFd) calculated by the driving force difference calculation device M4, a first desired value (Tts1) of the torque steer reducing torque is calculated by a first desired value determination device M51, to reduce the torque steer resulted from the driving force distribution, or the torque steer resulted from the traction control, as described before.

In the driving force calculation device M9, the driving force (Fd) is calculated on the basis of the power source output (Te) and gear ratio (Rt). And, on the basis of the driving force (Fd), a second desired value (Tts2) of the torque steer reducing torque is determined by a second desired value determination device M52, which is adapted to provide a second desired value (Tts2) of the torque steer reducing torque. The second desired value (Tts2) relates to the one resulted from the layout and characteristics of the drive shafts, i.e., torque steer resulted from drive shafts. Since the layout and characteristics of the drive shafts are known, the torque steer resulted from the drive shafts is created always in a predetermined steered direction. Therefore, the second desired value (Tts2) of the torque steer reducing torque can be obtained in the relationship with the driving force (Fd) determined in advance. Then, the first desired value (Tts1) of the torque steer reducing torque is modified by a modifying device M10, in accordance with the second desired value (Tts2) of the torque steer reducing torque, to provide the desired value (Tts) of the torque steer reducing torque. This desired value (Tts) of the torque steer reducing torque is added to the desired value (Tps) of the assist torque obtained by the assist torque desired value determination device M2, to output a new desired value, based on which the electric motor MT is controlled by the motor control device M6.

As described above, the first desired value (Tts1) of the torque steer reducing torque provided for reducing the torque steer resulted from the driving force distribution or the torque steer resulted from the traction control, which will be created in any direction, is compensated by the second desired value (Tts2) of the torque steer reducing torque provided for reducing the torque steer resulted from the drive shafts, which will be created only in a fixed direction. Therefore, a sufficient torque steer reducing torque is created to achieve the torque steer reducing control certainly, and the different feeling to the vehicle driver can be restrained. The steering apparatus of the present embodiment is provided with devices having the same reference numerals as shown in FIG. 1, and installed in the vehicle as shown in FIG. 2, in the same manner as the former embodiment.

Figure 11:
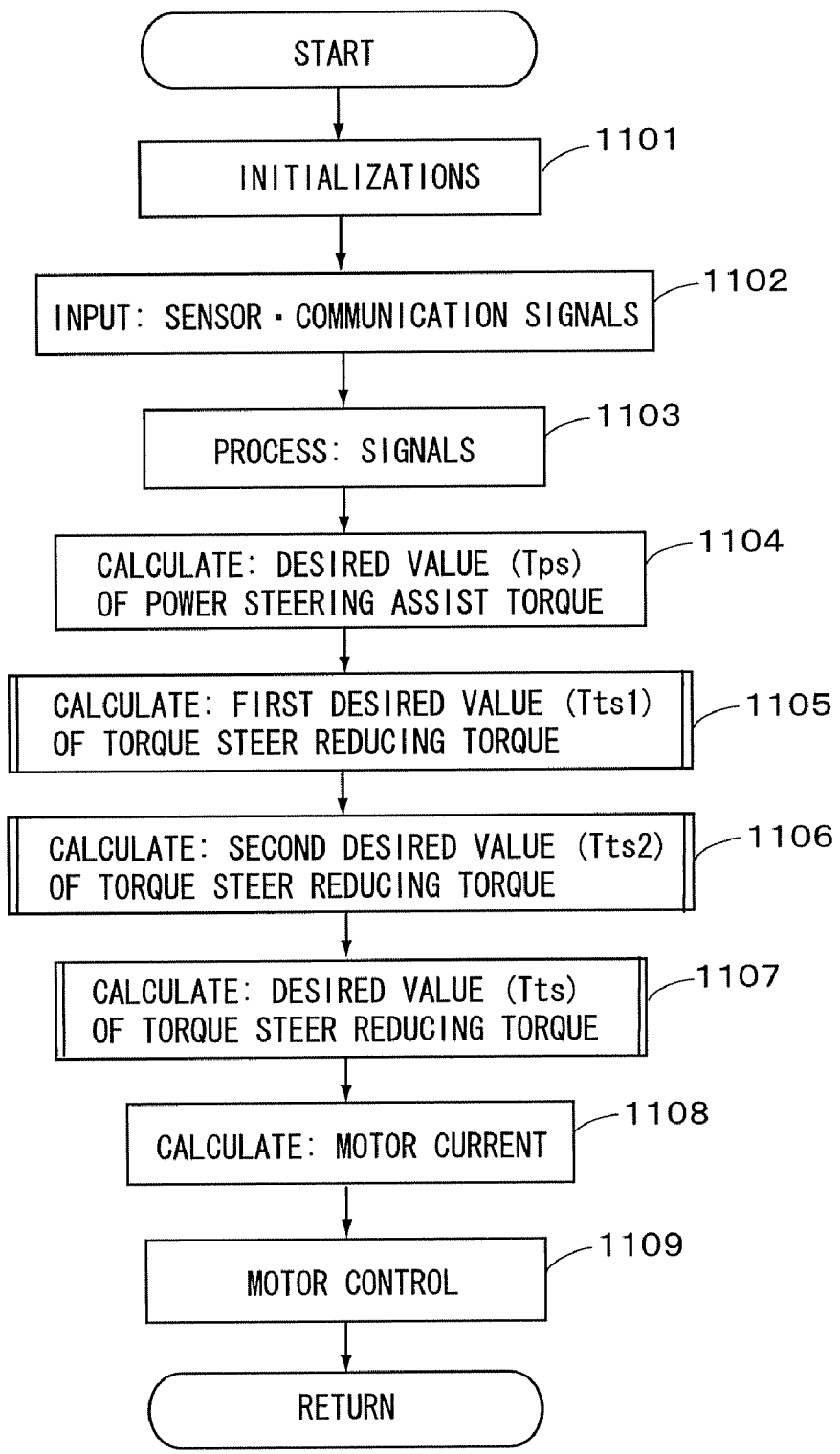
FIG. 11 is a flowchart of an example of steering control according to another embodiment of the present invention.

Next will be explained operation of the embodiment as shown in FIG. 10 (and FIG. 2), with reference to the flowchart as shown in FIG. 11. At the outset, the program provides for initialization of the system at Step 1101, and the signals detected by various sensors and communication signals on the communication bus are read at Step 1102. Then, the program proceeds to Step 1103, where the signals are processed by filtering or the like. Next, at Step 1104, the desired value (Tps) of the assist torque provided for the power steering control is calculated on the basis of steering torque (Ts). Then, the program proceeds to Step 1105, where the first desired value (Tts1) for reducing the torque steer resulted from the driving force distribution or the torque steer resulted from the traction control is calculated, as will be explained later with reference to FIG. 12. Also, at Step 1106, the second desired value (Tts2) for reducing the torque steer resulted from the drive shafts is calculated, as will be explained later with reference to FIG. 14. The program further proceeds to Step 1107, where the first desired value (Tts1) is modified in accordance with the second desired value (Tts2), to calculate the desired value (Tts) of the torque steer reducing torque. According to the present embodiment, the modification to the first desired value (Tts1) is made by adding the second desired value (Tts2). Then, at Step 1108, the desired value (Tts) of the torque steer reducing torque is added to the desired value (Tps) of the assist torque, to provide a new desired value (Tps+Tts), so that a current command value to the electric motor MT is calculated on the basis of the new desired value.

On the basis of the current command value, the electric motor MT is controlled at Step 1109.

Figure 12:
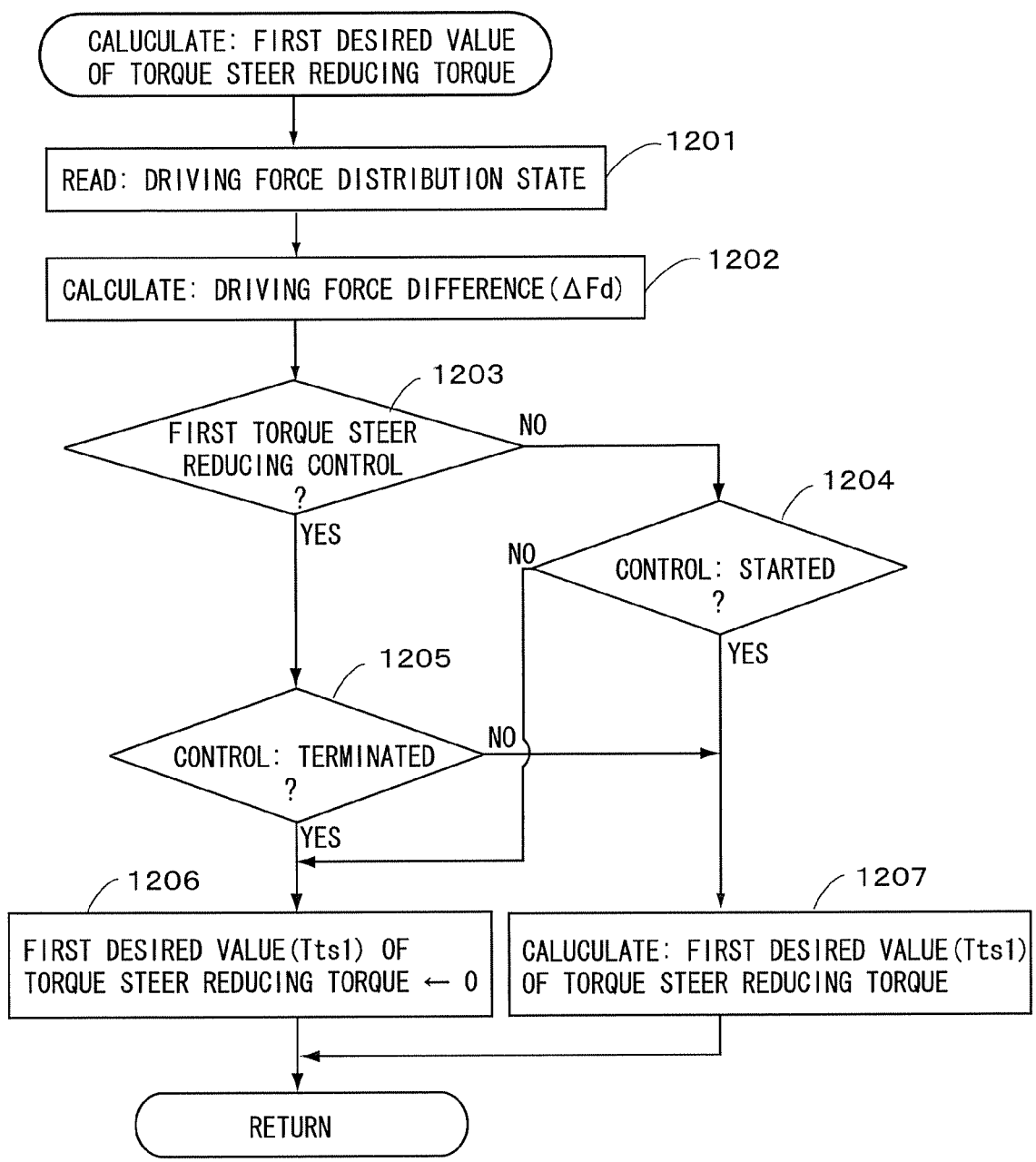
FIG. 12 is a flowchart of an example of calculating a first desired value of torque steer reducing torque according to another embodiment of the present invention.
Figure 13:
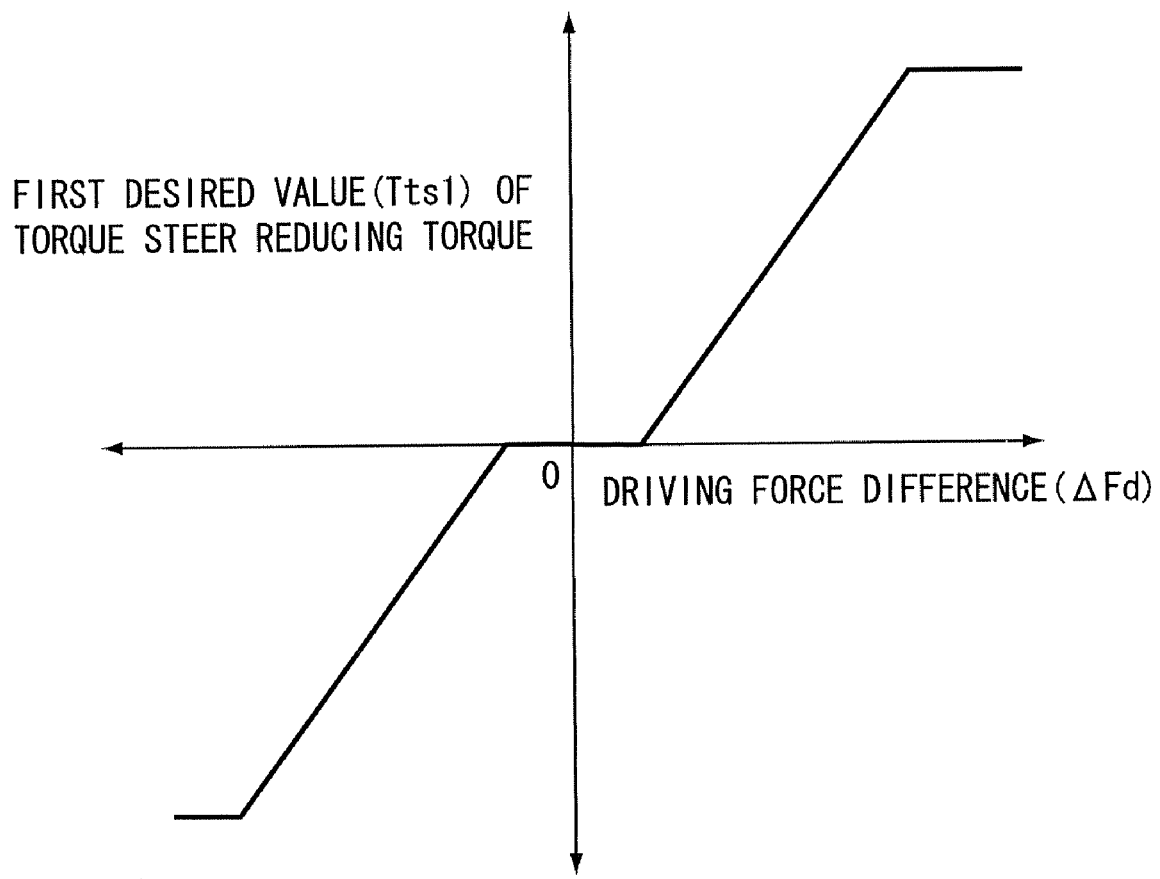
FIG. 13 is a diagram showing an example of a map for providing a first modified value of the torque steer reducing torque according to another embodiment of the present invention.

The first desired value (Tts1) for reducing the torque steer resulted from the driving force distribution or the torque steer resulted from the traction control is calculated according to the flowchart as shown in FIG. 12. At the outset, the driving force distribution state (Dst) detected by the driving force distribution detection device M31 is read at Step 1201, as the sensor signals and communication signals. Next, at Step 1202, the driving force difference (ΔFd) between the right and left driving wheels is calculated on the basis of the distribution state (Dst). The driving force distribution detection device M31, distribution state (Dst), and driving force difference calculation device M4 will be described later in detail. Then, the program proceeds to Step 1203, where it is determined whether the first torque steer reducing control is being controlled, or not. If it is determined that the first torque steer reducing control is not being controlled, the program proceeds to Step 1204, where it is determined whether the first torque steer reducing control is to be started. Or, if it is determined at Step 1204 that the first torque steer reducing control is not to be started, the program proceeds to Step 1206, where the first desired value (Tts1) of the torque steer reducing torque is set to be zero (0). Instead, if it is determined at Step 1203 that the first torque steer reducing control is being performed, the program proceeds from Step 1205, where it is determined whether the first torque steer reducing control is to be terminated, or not. If it is determined that the torque steer reducing control is not to be terminated, the program proceeds to Step 1207, where the first desired value (Tts1) of the torque steer reducing torque is continuously calculated. And, if the conditions for terminating the first torque steer reducing torque are fulfilled, the program proceeds to Step 1206, where the first desired value (Tts1) is set to be zero. The calculation of the first desired value (Tts1) executed at Step 1207 is performed on the basis of the driving force difference (ΔFd), as shown in FIG. 13. With respect to the driving force difference (ΔFd), i.e., the torque steer resulted from the difference in driving force between the right and left wheels, it can not be determined which wheel of them will become larger in driving force, so that it can be created in both directions in response to the steering direction of the steering wheel SW, as shown in FIG. 13.

Hereinafter, will be explained the driving force distribution detection device M31, distribution state (Dst), and driving force difference calculation device M4. In order to reduce the torque steer resulted from the traction control, the hydraulic pressure sensor (indicated by PSxx in FIG. 2) disposed in each wheel cylinder can be used as the driving force distribution detection device M31. In other words, the hydraulic pressure sensor for obtaining the braking torque used in the traction control, can be served as the driving force distribution detection device M31. With respect to the hydraulic pressure applied to the driving wheel in the traction control, it can be estimated by means of the actuating state of hydraulic pressure control valve or the like installed in the traction control device, without using the hydraulic pressure sensor. Therefore, a known device for estimating the braking torque in the traction control can be served as the driving force distribution detection device M31. Furthermore, the braking torque in the traction control is controlled by a desired value (desired hydraulic pressure, desired wheel slip, or the like) for the traction control, which is calculated in the electronic brake control unit ECU4. Therefore, a device for setting the desired value in the traction control may be served as the driving force distribution detection device M31.

In the case where the traction control is performed, when the braking torque is applied to one driving wheel, the driving force corresponding to the braking torque will be increased with respect to the other driving wheel. Therefore, the braking torque applied in the traction control may be served as the driving force distribution state (Dst). Consequently, the driving force difference (ΔFd) is calculated on the basis of the driving force distribution state (Dst), i.e., braking torque, according to the driving force difference calculation device M4.

Also, in the case where the limited slip differential is served as the driving force difference device, the detection device for detecting the differential state of the limited slip differential may be used as the driving force distribution detection device M31. Since the limited slip differential torque used in the limited slip differential has such a characteristic that the torque is shifted from a side rotated at a high speed to a side rotated at a low speed, the wheel speed sensors VWxx for the right and left driving wheels may be employed as the driving force distribution detection device M31, so that on the basis of the results detected by the wheel speed sensors VWxx, the relative speed difference between the right and left driving wheels may be obtained to provide the driving force distribution state (Dst). Accordingly, the limited slip differential torque is calculated on the basis of the relative speed difference between the right and left driving wheels, to provide the driving force difference (ΔFd).

Furthermore, in the case where an electronically controlled driving force distribution device is provided, a device for providing a desired value of driving force distribution may be served as the driving force distribution detection device M31. The electronically controlled driving force distribution device is controlled in accordance with the traveling state of the vehicle, and the driving force between the right and left driving wheels is controlled in accordance with the desired value of driving force distribution of the device. Therefore, the device for providing the desired value of driving force distribution may be served as the driving force distribution detection device M31, and the desired value of the driving force distribution may be used as the driving force distribution state (Dst), and the driving force difference (ΔFd) can be calculated on the basis of the desired value of driving force distribution, by the driving force difference calculation device M4.

Figure 14:
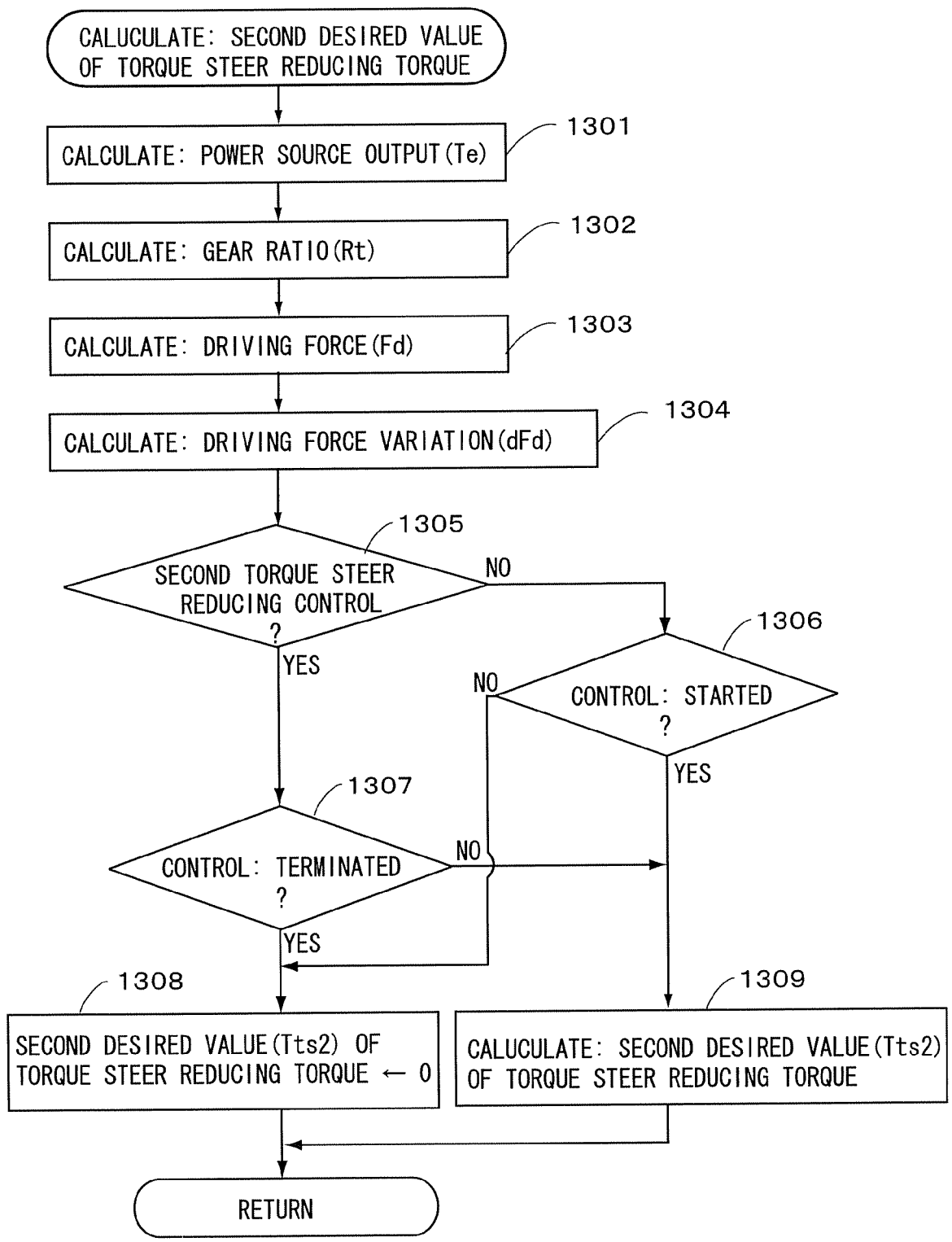
FIG. 14 is a flowchart of an example of calculating a second desired value of torque steer reducing torque according to another embodiment of the present invention.

On the other hand, the second desired value (Tts2) of the torque steer reducing torque is calculated according to the flowchart as shown in FIG. 14. At the outset, the output (Te) of the engine EG served as the power source is calculated at Step 1301, on the basis of the sensor signals and communication signals read at Step 1102 in FIG. 11. The output (Te) is calculated according to a relationship between the engine speed (Ne) and throttle opening (Tk) as shown in FIG. 5, for example. Then, at Step 1302, the gear ratio (Rt) is calculated on the basis of the result detected by the gear position sensor GP of the transmission TR. And, the driving force (Fd) transmitted through the drive shafts is calculated at Step 1303, on the basis of the output (Te) of the power source and the gear ratio (Rt) of the transmission. Further, at Step 1304, variation (dFd) in time of the driving force (Fd) is calculated.

Then, the program proceeds to Step 1305, where it is determined whether the second torque steer reducing control is being controlled, or not. If it is determined that the second torque steer reducing control is not being controlled, the program proceeds to Step 1306, where it is determined whether the second torque steer reducing control is to be started, or not. If it is determined that the second torque steer reducing control is to be started, the program proceeds to Step 1309, where the second desired value (Tts2) of torque steer reducing torque is calculated, to perform the second torque steer reducing control. On the contrary, if it is determined that the second torque steer reducing control is not to be started, the program proceeds to Step 1308, where the second desired value (Tts2) is set to be zero (0). If it is determined at Step 1305 that the second torque steer reducing control is being controlled, the program further proceeds to Step 1307, where it is determined whether the second torque steer reducing control is to be terminated, or not. If it is determined that the second torque steer reducing control is not to be terminated, the program proceeds to Step 1309, where the second desired value (Tts2) of torque steer reducing torque is calculated, whereas, if the conditions for terminating the second torque steer reducing torque are fulfilled, the program proceeds to Step 1308, where the second desired value (Tts2) is set to be zero.

Figure 15:
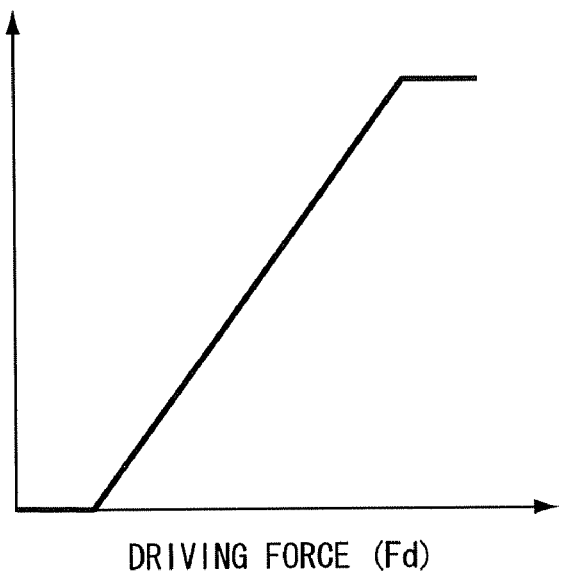
FIG. 15 is a diagram showing an example of a map for providing a second desired value of the torque steer reducing torque according to another embodiment of the present invention.
Figure 16:
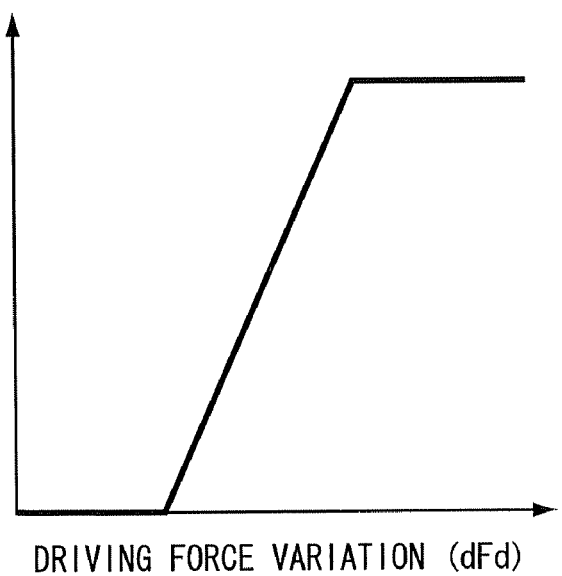
FIG. 16 is a diagram showing an example of a map for providing a modified value of the torque steer reducing torque according to another embodiment of the present invention.

The conditions for starting the torque steer reducing control used at Step 1306 are determined, depending whether the driving force (Fd) is equal to or greater than a predetermined force (Fd1), or not. In addition, variation (dFd) of the driving force may be considered, so that the driving force (Fd)≧predetermined force (Fd1) and its variation (dFd)≧predetermined variation (dFd1) may be used for the starting conditions. Also, the starting conditions may be provided on the basis of a function of the driving force (Fd) and its variation (dFd). And, the calculation of the second desired value (Tts2) executed at Step 1309 is performed on the basis of the driving force (Fd), as shown in FIG. 15. Furthermore, by use of the relationship as shown in FIG. 16, a modified value (Ttsh) of the torque steer reducing torque may be calculated to be served as a modified value to the second desired value (Tts2), and added to the second desired value (Tts2) of the torque steer reducing torque, to modify the second desired value (Tts2).

Figure 17:
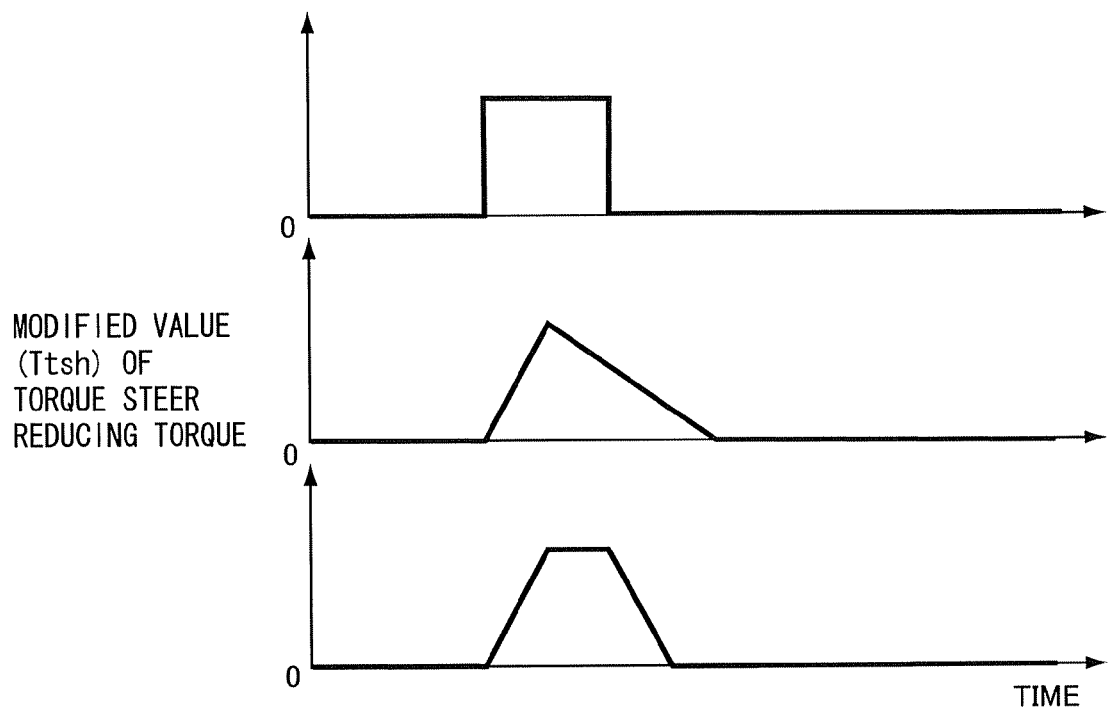
FIG. 17 is a diagram showing a pulse wave form indicative of a modified value of the torque steer reducing torque, according to another embodiment of the present invention.
Figure 18:
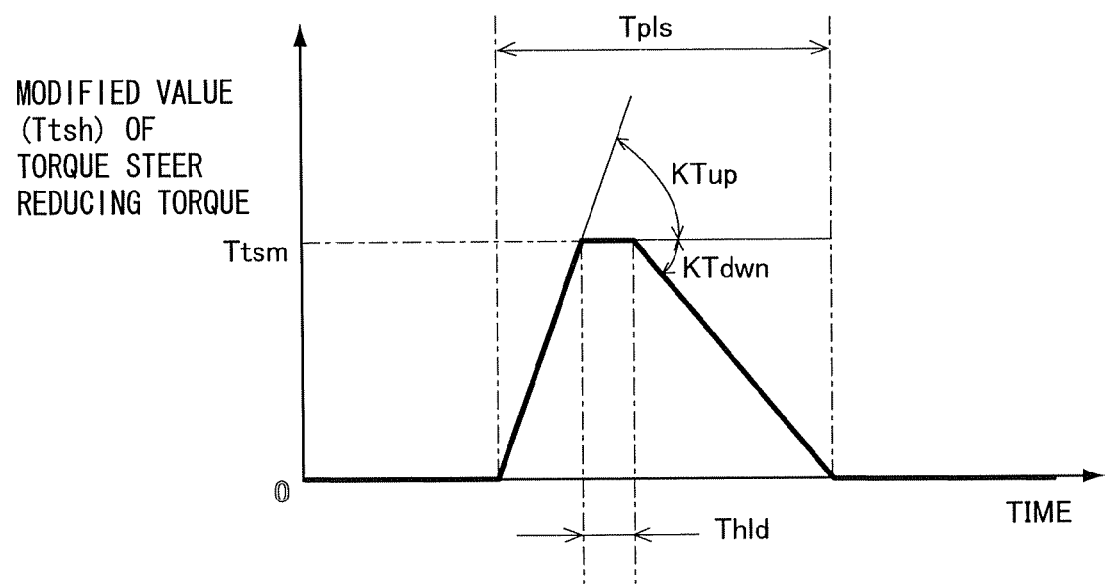
FIG. 18 is a diagram showing an example of a parameter for providing a pulse wave form indicative of a modified value of the torque steer reducing torque, according to another embodiment of the present invention.
Figure 19:
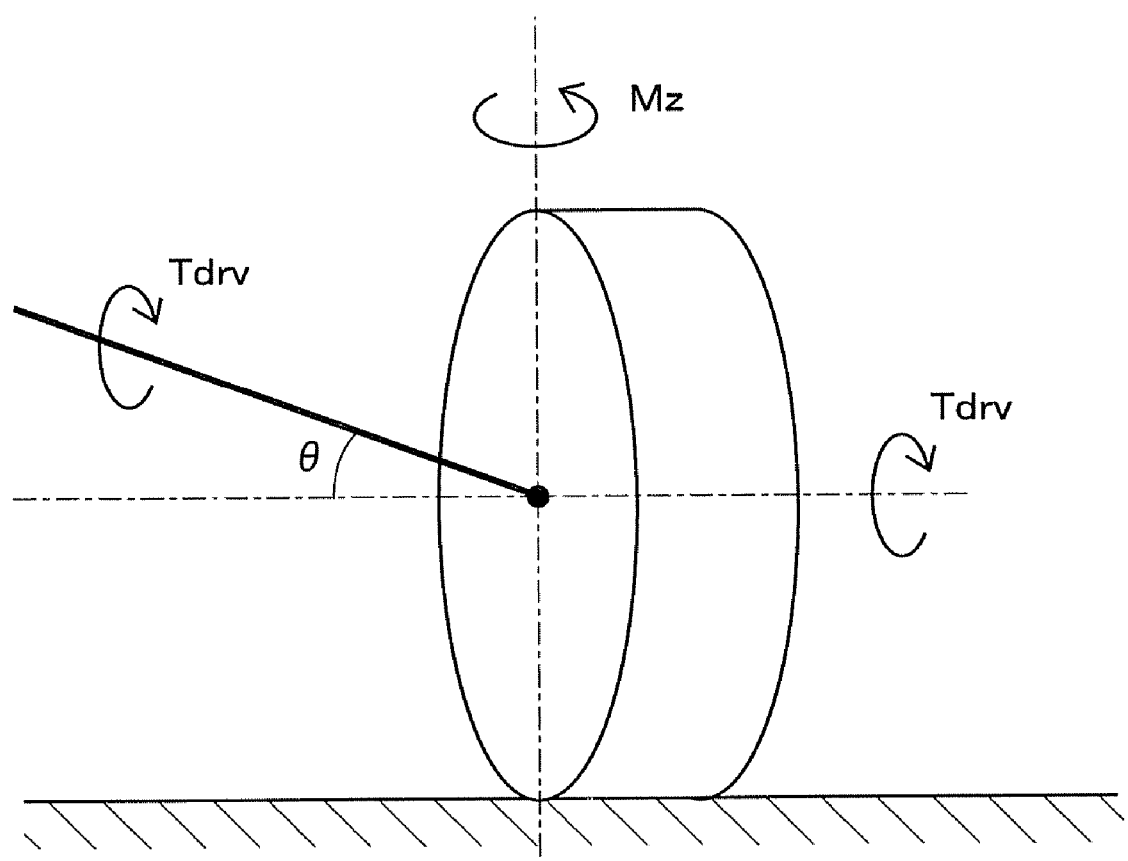
FIG. 19 is a perspective view showing a relationship between a drive shaft and a driving wheel, according to a conventional vehicle.
Figure 20:
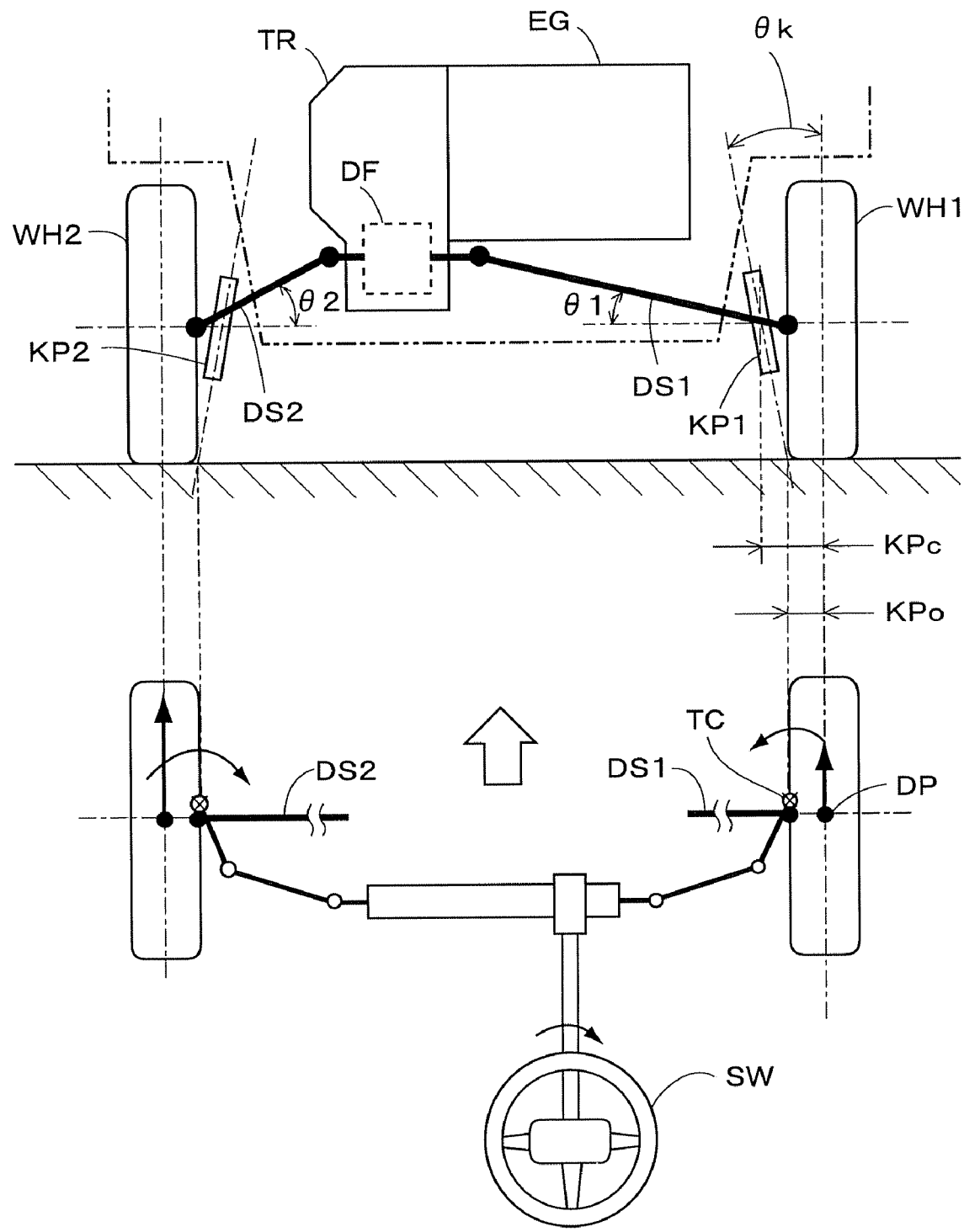
FIG. 20 is a front and plan view of a part including a steering apparatus, according to a vehicle with steered wheels thereof being served as its driving wheels.
Figure 21:
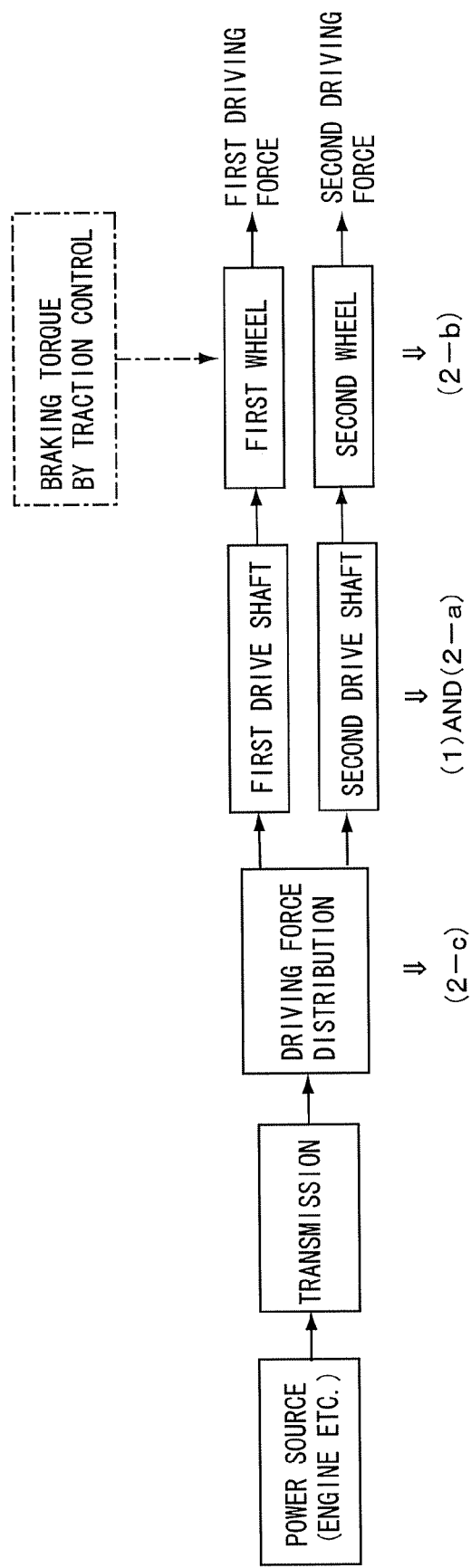
FIG. 21 is a block diagram showing parts which create torque steer, when a vehicle is accelerated.

The modified value (Ttsh) of the torque steer reducing torque may be obtained in pulse wave forms for a predetermined time period, e.g., rectangular wave form, triangular wave form or trapezoidal wave form as shown in FIG. 17. The wave form shown at the lowest part in FIG. 17 can be provided as shown in FIG. 18. That is, at least more than one of parameters including output time (Tpls) of the pulse wave form, increasing gradient (KTup) of the modified value (Ttsh) of the torque steer reducing torque, maximum value (Ttsm) of the modified value (Ttsh) of the torque steer reducing torque, holding time (Thld) of the maximum value, and decreasing gradient (KTdwn) of the modified value (Ttsh) of the torque steer reducing torque, may be set to be varied in accordance with the driving force (Fd) or its variation (dFd).

According to the embodiment as described above, with respect to the torque steer resulted from the layout and characteristics of the drive shafts, i.e., the torque steer resulted from the drive shafts, the steered direction and the magnitude of the driving force can be detected in advance. Therefore, sufficient torque steer reducing torque can be calculated, with the second desired value (Tts2) of the torque steer reducing torque modifying the first desired value (Tts1) of the torque steer reducing torque provided for reducing the torque steer resulted from the driving force distribution or the torque steer resulted from the traction control, which is determined by road surface conditions or vehicle traveling state, and which will be caused in any steering direction. As a result, the torque steer, which is created for the steered wheel to steer the steering wheel, when the vehicle is accelerated, can be reduced effectively, without giving a different feeling to the vehicle driver.

It should be apparent to one skilled in the art that the above-described embodiment are merely illustrative of but a few of the many possible specific embodiments of the present invention. Numerous and various other arrangements can be readily devised by those skilled in the art without departing from the spirit and scope of the invention as defined in the following claims.

What is claimed is:

1. A steering control apparatus for a vehicle having a steering wheel for steering a pair of right and left steered wheels of said vehicle, a power source for generating power, drive shafts for transferring the power to said right and left steered wheels, to be served as right and left driving wheels of said vehicle, respectively, a characteristic of said drive shafts including at least one of a length and arrangement of said drive shafts being provided asymmetrically with respect to a transverse direction of said vehicle, and traction control means for controlling braking torque applied to said right and left steered wheels, respectively, comprising:

braking torque detection means for detecting the braking torque applied to said right and left steered wheels, respectively;

driving force difference calculation means for calculating a driving force difference between said right and left steered wheels, on the basis of the braking torque applied to each of said right and left steered wheels detected by said braking torque detection means;

power source state detection means for detecting an actuating state of said power source;

steering torque control means for controlling steering torque created by said steering wheel, and applying torque steer reducing torque to said steering wheel, to reduce a torque steer for varying a steer-holding force in response to variation of the driving force, the torque steer being caused to vary the steer-holding force resulting from the traction control, and the torque steer being caused to vary the steer-holding force resulting from the characteristic of the drive shafts created in only one direction with respect to the steering direction of the steering wheel; and desired value determination means for determining a desired value of the torque steer reducing torque, on the basis of the driving force difference calculated by said driving force difference calculation means, and the actuating state of said power source detected by said power source state detection means, wherein said steering torque control means applies the torque steer reducing torque to said steering wheel, in accordance with the desired value of the torque steer reducing torque determined by said desired value determination means, to reduce the torque steer;

wherein said desired value determination means determines the desired value of the torque steer reducing torque to decrease the torque steer resulting from the traction control and increased according to the characteristic of the drive shafts, in accordance with a first characteristic for determining the desired value, when a sign of the driving force difference is positive, and when the steered direction of the torque steer resulting from the traction control is the same as the steered direction of the torque steer resulting from the characteristic of the drive shafts created in only one direction with respect to the steering direction of the steering wheel, and determines the desired value of the torque steer reducing torque in accordance with a second characteristic for determining the desired value to decrease the torque steer resulting from the traction control and cancelled according to the characteristic of the drive shafts, when the sign of the driving force difference is negative, and when the steered direction of the torque steer resulting from the traction control is opposite to the steered direction of the torque steer resulting from the characteristic of the drive shafts created in only one direction with respect to the steering direction of the steering wheel, said second characteristic being set to provide the desired value of relatively small absolute value compared with said first characteristic.

2. A steering control apparatus as set forth in claim 1, further comprising driving force calculation means for calculating the driving force transferred to said driving wheels through said drive shafts, wherein at least one of said first characteristic for determining the desired value and said second characteristic for determining the desired value is modified, on the basis of the driving force calculated by said driving force calculation means.

3. A steering control apparatus as set forth in claim 2, wherein said first characteristic for determining the desired value is modified to be relatively large, when the driving force calculated by said driving force calculation means is relatively large, and said first characteristic for determining the desired value is modified to be relatively small, when the driving force calculated by said driving force calculation means is relatively small.

4. A steering control apparatus as set forth in claim 2, wherein said desired value of the torque steer reducing torque is determined in accordance with said first characteristic, when the sign of the driving force difference is positive, said first characteristic being provided according to the driving force difference multiplied by a first constant provided in accordance with the driving force, and wherein said desired value of the torque steer reducing torque is determined in accordance with said second characteristic, when the sign of the driving force difference is negative, said second characteristic being provided according to the driving force difference multiplied by a second constant provided in accordance with the driving force.

5. A steering control apparatus as set forth in claim 4, wherein said first constant is provided to be increased, with the driving force being increased, and wherein said second constant is provided to be decreased, with the driving force being increased.

6. A steering control apparatus as set forth in claim 2, wherein, if the driving force is equal to or greater than a predetermined value, the torque steer reducing control is started.

7. A steering control apparatus as set forth in claim 1, wherein said first characteristic is set to provide the desired value of relatively large absolute value against the driving force difference, and said second characteristic is set to provide the desired value of relatively small absolute value against the driving force difference.

* * * * *